United States Patent
Solovyev et al.

(10) Patent No.: US 12,101,462 B2
(45) Date of Patent: Sep. 24, 2024

(54) METHOD AND APPARATUS FOR RESTRICTED LONG-DISTANCE MOTION VECTOR PREDICTION

(71) Applicant: HUAWEI TECHNOLOGIES CO., LTD., Shenzhen (CN)

(72) Inventors: Timofey Mikhailovich Solovyev, Moscow (RU); Jianle Chen, Santa Clara, CA (US); Sergey Yurievich Ikonin, Moscow (RU); Maxim Borisovitch Sychev, Moscow (RU)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 16/918,733

(22) Filed: Jul. 1, 2020

(65) Prior Publication Data

US 2020/0351493 A1    Nov. 5, 2020

Related U.S. Application Data

(63) Continuation of application No. PCT/RU2019/050073, filed on May 31, 2019.
(Continued)

(51) Int. Cl.
*H04N 19/105*    (2014.01)
*H04N 19/137*    (2014.01)
(Continued)

(52) U.S. Cl.
CPC ......... *H04N 19/105* (2014.11); *H04N 19/137* (2014.11); *H04N 19/159* (2014.11); *H04N 19/1883* (2014.11)

(58) Field of Classification Search
None
See application file for complete search history.

(56) References Cited

U.S. PATENT DOCUMENTS

2012/0134415 A1    5/2012    Lin et al.
2012/0320984 A1    12/2012   Zhou
(Continued)

FOREIGN PATENT DOCUMENTS

CN    107027038 A    8/2017
WO    2019079611 A1  4/2019

OTHER PUBLICATIONS

An et al., "Enhanced Merge Mode based on JEM7.0," Join Video Experts Team (JVET) of ITU-T SG 16 WP 3 and ISO/IEC JTC 1/SC 29/WG 11, JVET-J0059-V1, Total 14 pages, 10th Meeting: San Diego, US (Apr. 10-20, 2018).*

(Continued)

*Primary Examiner* — Edemio Navas, Jr.
(74) *Attorney, Agent, or Firm* — Leydig, Voit & Mayer, Ltd.

(57) ABSTRACT

The present disclosure relates to encoding and decoding of video images. Motion vectors are used for prediction of an image for a current coding unit, which is within a current coding tree unit. The motion vectors are taken from a list of motion vector candidates. The list is generated for the current coding unit using a pattern of positions of allowed motion vectors, and in dependence on the positions of the pattern relative to the current coding unit, and on the position of the current coding unit within the current coding tree unit. From the pattern, a subset of positions is selected and positions are restricted to positions within the current coding tree unit, while other pattern positions not available or not stored in a buffer are excluded. Other excluded pattern positions may be substituted and/or adjusted to as to become available and/or are being stored in the buffer.

14 Claims, 28 Drawing Sheets

Related U.S. Application Data

(60) Provisional application No. 62/693,345, filed on Jul. 2, 2018, provisional application No. 62/679,009, filed on May 31, 2018.

(51) Int. Cl.
*H04N 19/159* (2014.01)
*H04N 19/169* (2014.01)

(56) References Cited

U.S. PATENT DOCUMENTS

| | | | |
|---|---|---|---|
| 2014/0016701 A1 | 1/2014 | Chen et al. | |
| 2014/0092967 A1 | 4/2014 | Seregin et al. | |
| 2016/0227218 A1 | 8/2016 | Trudeau et al. | |
| 2017/0127041 A1 | 5/2017 | Bang et al. | |
| 2017/0310961 A1 | 10/2017 | Liu et al. | |
| 2018/0098070 A1* | 4/2018 | Chuang | H04N 19/137 |
| 2019/0364279 A1* | 11/2019 | Yasugi | H04N 19/157 |

OTHER PUBLICATIONS

An et al., "Enhanced Merge Mode based on JEM7.0," Joint Video Experts Team (JVET) of ITU-T SG 16 WP 3 and ISO/IEC JTC 1/SC 29/WG 11, JVET-J0059-v1, Total 14 pages, 10th Meeting: San Diego, US (Apr. 10-20, 2018).

Ye et al., "Merge mode modification on top of Tencent's software in response to CfP," Joint Video Experts Team (JVET) of ITU-T SG 16 WP 3 and ISO/IEC JTC 1/SC 29/WG 11, JVET-J0058-v1, Total 4 pages, 10th Meeting: San Diego, US (Apr. 10-20, 2018).

Li et al., "Description of SDR video coding technology proposal by Tencent," Joint Video Experts Team (JVET) of ITU-T SG 16 WP 3 and ISO/IEC JTC 1/SC 29/WG 11, JVET-J0029-v1, Total 34 pages, 10th Meeting: San Diego, US (Apr. 10-20, 2018).

Chen et al., "Description of SDR, HDR and 360° video coding technology proposal by Qualcomm and Technicolor—low and high complexity versions," Joint Video Exploration Team (JVET) of ITU-T SG 16 WP 3 and ISO/IEC JTC 1/SC 29/WG 11, JVET-J0021, Total 43 pages, 10th Meeting: San Diego, US, (Apr. 10-20, 2018).

Sjöberg et al., "Description of SDR and HDR video coding technology proposal by Ericsson and Nokia," Joint Video Exploration Team (JVET) of ITU-T SG 16 WP 3 and ISO/IEC JTC 1/SC 29/WG 11, JVET-J0012-v1, Total 32 pages, 10th Meeting: San Diego, CA, USA (Apr. 10-20, 2018).

"Series H: Audiovisual and Multimedia Systems, Infrastructure of audiovisual services—Coding of moving video, High efficiency video coding," Recommendation of ITU-T H.265, ITU-T Telecommunication Standardization Sector of ITU, pp. 1-692, International Telecommunication Union, Geneva, Switzerland (Feb. 2018).

"Series H: Audiovisual and Multimedia Systems, Infrastructure of audiovisual services—Coding of moving video, Advanced video coding for generic audiovisual services," Recommendation of ITU-T H.264, ITU-T Telecommunication Standardization Sector of ITU, pp. 1-812, International Telecommunication Union, Geneva, Switzerland (Apr. 2017).

Garg et al., "Interpolated Candidate Motion Vectors for Boundary Matching Error Concealment Technique in Video," IEEE Transactions on Circuits and Systems—II: Express Briefs, vol. 53, No. 10, pp. 1039-1043, Institute of Electrical and Electronics Engineers, New York, New York (Oct. 2006).

Xin Yakun et al., "Research and optimization of Merge mode candidate decision in HEVC," Technique and Method, pp. 72-74 (2016). With an English Abstract.

Schwarz et al., "Block Structures and Parallelism Features in HEVC," Chapter 3 in V. Sze et al., (eds.), High Efficiency Video Coding (HEVC): Algorithms and Architectures, Integrated Circuits and Systems, Total 43 pages, Springer International Publishing Switzerland (2014).

\* cited by examiner

METHOD AND APPARATUS FOR RESTRICTED LONG-DISTANCE MOTION VECTOR PREDICTION

CROSS-REFERENCE TO OTHER APPLICATIONS

This application is a continuation of International Disclosure No. PCT/RU2019/050073, filed on May 31, 2019, which claims priority to U.S. Patent Application No. 62/679,009, filed on May 31, 2018 and U.S. Patent Application No. 62/693,345 filed on Jul. 2, 2018. The disclosure of which is hereby incorporated by reference in its entirety.

TECHNICAL FIELD

The present disclosure relates to encoding and decoding of video images, in particular, to motion prediction.

BACKGROUND

Digital video communication and storage applications are implemented by a wide range of digital devices such as, e.g., digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason, the support of video coding standards is a mandatory requirement for almost any video compression application.

Video compression techniques, such as inter prediction, intra prediction, and loop filters, have demonstrated to be effective and thus adopted into various video coding standards, such as H.264/AVC and H.265/HEVC.

A basic processing unit of video compression is usually called a macroblock, which is a part of a picture having size of e.g. 16×16 or 64×64 pixels. In the latest video coding standard for H.265/HEVC, a so-called Coding Tree Unit (CTU) is used as a basic processing unit. The CTU is also referred to as a largest coding unit (LCU). In H.265/HEVC, CTUs are processed one by one in a scan order from the top-left to bottom-right corner of the picture. Each CTU may be further divided into smaller coding units (CU) by using, e.g., a quad-tree split. A CU comprises information related to inter and intra prediction information as well as residuals.

An important part of inter prediction in the H.265/HEVC standard is motion vector (MV) coding. Motion vectors are usually predictively coded, e.g., by the following two schemes:
1. A motion vector is constructed from a motion vector predictor and a difference between the motion vector obtained by motion estimation process and the predictor. This MV coding method in HEVC standard is called advanced motion vector prediction.
2. A motion vector is derived by selection from a configurable set of candidates (predictors), without encoding a motion vector difference. This approach is called merge mode.

For both techniques, a large set of potential prediction candidates constructed from already encoded motion vectors can be accounted. In the H.265/HEVC standard, there are four groups of motion vector predictors: spatial, temporal, combined Bi-predictive, and zero candidates. During the encoding process, the best motion vector predictor is selected from an amount of candidates and its index in a candidate list is written to a bitstream. An example of locations for spatial MVP (Motion Vector Prediction) candidates (for merge mode) in the H.265/HEVC standard is shown in FIG. 6.

In the given example, MVP candidates are denoted as $A_0$, $A_1$, $B_0$, $B_1$, and $B_2$, respectively. The locations $A_i$ indicate the predictors to the left, the locations $B_j$ indicate the predictors at the top of the current block. Herein, the current block is also referred to as the current coding unit CU. It should be noted that, in the general case, the candidate locations may depend on a block coding order. Depending on the coding order, candidates may be selected from the top, left, right, and bottom of adjacent blocks, i.e. blocks adjacent to the current block. All of the spatial MVP candidates (for merge mode and for advanced motion vector prediction) in the H.265/HEVC standard belong to the adjacent neighboring blocks. This means that they share a border with the current block.

SUMMARY

Embodiments of the disclosure are defined by the features of the independent claims, and further advantageous implementations of the embodiments by the features of the dependent claims.

The present disclosure provides an apparatus and a method for performing (1) additional checks on Long-Distance Motion Vector Prediction (LDMVP) pattern positions, depending on the position of a current CU within the current CTU, and/or (2) modifying and/or replacing some positions of the LDMVP pattern, depending on the position of the current CU within the CTU, and/or (3) adjusting some of the LDMVP pattern positions depending on the position of the CU within the CTU. The methods corresponding to any of (1) to (3) may be included into the LDMVP list generation algorithm (i.e. LDMVP list generation method). Throughout the present disclosure, the term "LDMVP positions", "pattern positions", "LDMVP pattern positions", "positions of a pattern", and/or "positions of a LDMVP pattern" are used synonymously.

According to an aspect of the present disclosure, an apparatus is provided for generating a list of one or more motion vector candidates, MVCs, comprising a processing circuitry configured to determine the MVCs for a current coding unit, CU, in dependence on a position of a pattern relative to a position of the current CU, the pattern defining positions of motion vectors, MVs, and the position of the current CU within a coding tree unit, CTU.

The motion vector candidates are used for the motion prediction for the current CU. This means that the motion information of motion vectors are used at the respective candidate positions for the prediction. Thus, the motion vector positions are positions of the corresponding vector candidate block. The block may be one pixel/sample (pixel or sample) and/or a plurality of samples corresponding to a block of samples. In other words, a position of a motion vector is the position or location within a video frame (or picture) specifying one or more pixels (or samples) to which the motion vector is assigned, or in even other words, is the position of the corresponding vector candidate block (or of the corresponding one or more samples) to which the motion vector is assigned.

The position of the current CU may be the top-left corner of the current CU, with the positions being in units of pixels or a pixel block unit. The block unit may, for example, be a 2×2 pixel block or any other unit. The position of the current CU, with the CU being within the current CTU, may be a distance of the top-left corner of the current CU to a (pixel/sample) position of the top-left corner of the current CTU. The pattern position relative to the position of the current CU may be predetermined. This means that said relative position may be set to a predefined value.

The determining of MVCs using relative position information between the current CU and a pattern and the current CU position within the CTU may provide an advantage of improving the prediction for a CU of a video frame employing relative position information. In particular, the use of MV positions of a pattern provides an advantageous effect that only a sparse number of position are used from which possible motion information is obtained and/or acquired. Thus, the use of a more limited number of positions as defined by the pattern results in less read-write operations when accessing motion information, for example. Thus, the sparse number of pattern positions makes the prediction more efficient and fast.

Moreover, the pattern may be any pattern suitable for determining motion information based on the motion vectors at the pattern positions. In other words, the pattern may be adjusted, for example, in terms of its size and/or extension within a video frame relative to the current CU and may be chosen or designed so as to have a particular structure and/or shape. For example, the pattern i.e. the pattern positions may be determined or generated such that the pattern positions have a "square", "diagonal", "triangle", or "star" structure, as shown by the pattern examples of FIGS. 7 to 10. The pattern is not limited to the ones shown in FIGS. 7 to 10, and may have any other shape and/or structure suitable for restricting motion information obtained at positions based on the pattern. Thus, using a pattern may provide an advantage of making the prediction more flexible so as to use only motion information from positions restricted by the pattern positions. This may include pattern positions that may be added and/or substituted or the like.

According to an aspect of the present disclosure, the processing circuitry of the apparatus is configured to determine the MVCs for the current CU including selecting a subset of MV positions from the pattern positions.

This means that the initial pattern (i.e., the initial positions) may be subject to additional checks, upon which certain pattern positions may be retained, discarded, and/or altered. In other words, one or more of the pattern positions may be selected.

The selection of a subset of MV positions may provide an advantage of complexity reduction. This means, in particular, that unnecessary data read/write operations and/or unnecessary access to data from some neighboring blocks is avoided. A further technical advantage may be that, therefore, the storing of additional data is avoided. As a result, the memory requirements may be reduced. Moreover, the subset selection may provide an advantage of a further adaptation of some of the pattern positions, which improves further the accuracy of the prediction.

In one exemplary embodiment of the present disclosure, the selecting includes selecting from the pattern positions those MV positions which are within the current CTU.

This may provide an advantage of avoiding unnecessary data read-write to/from the buffer (e.g. a line buffer) as said information is already available for positions within the current CTU.

In one exemplary embodiment of the present disclosure, the selecting of the subset of MV positions is performed by excluding from the pattern positions those MV positions which are not available and/or are not stored in a buffer.

This means that some pattern positions may lie outside of a current video frame, i.e. the position is larger than the size of the current frame. Thus, information for that point does not exists. This may result also in restricting the size/extension of the pattern when the pattern is generated.

Motion information may also not be available at a position as result of a encoding/decoding order (encoding and/or decoding order) performed for the CUs of the frame. In other words, motion information at the bottom right region of a CTU does not yet exist at a specific time as this region is subject to encoding/decoding at a later time. Thus, even if a position in that region is generated (i.e. is part of the pattern), motion information is not present for that point at that time.

Moreover, motion information may also not be stored in a memory (i.e. the buffer) as that the respective information may be accessed. Such a buffer may, for example, be a line buffer which has fast read-write access times and is commonly used to store motion information of restricted regions of CTUs neighboring the current CTU for which the motion prediction is performed. Line buffers are fast data are read and/or written for the entire buffer line in parallel.

The exclusion of pattern positions not available and/or stored in the buffer may provide an advantage of not using pattern positions and hence not possibly obtaining motion information from those positions for which said motion information does not exists. Thus, excluding those points may reduce further the number of pattern positions to those positions for which motion information is actually available. Thus, the prediction may become faster as less pattern positions may be used for the motion prediction. Moreover, unnecessary read-write access of motion information at those motion vector positions for which said information is not available may be avoided. This makes the prediction more efficient and fast.

According to an aspect of the present disclosure, the processing circuitry is configured to determine the MVCs for the current CU including replacing one or more of the excluded MV positions by substitute MV positions determined in dependency on the excluded MV positions so as to fulfill one or more predetermined conditions.

This means that one or more of the excluded and/or discarded pattern positions may be subject to changes of their coordinate positions such as by replacing or calculating new positions under the constraints of predetermined conditions.

The replacement is directed toward the discarded positions and is performed based on the discarded positions, corresponding to those pattern positions for which motion information is not available and/or not stored in the buffer. The discarded positions are also referred to as rejected positions and/or excluded positions, and are alternative terms.

The position replacement of discarded positions may provide an advantage of not reducing the number of positions of possible motion vector candidates compared to the number of positions of the original pattern. In other words, a sufficient number of MV positions may be needed for performing a prediction with high accuracy and quality. This may be achieved by replacing some of the excluded pattern positions by positions for which motion information is available. This may maintain the number of MV positions near the number of pattern positions.

The replacement positions are determined in dependency on the discarded positions such that the replaced positions fulfill some predetermined conditions. In other words, replaced positions are determined using positional information of the discarded positions, combined with one or more constraints. This may provide an advantage that parts of the position information of the original pattern, the shape/structure of which, for example, may have been chosen specific to the content of a video frame, is transferred completely and/or in part onto the replaced positions.

According to one exemplary embodiment of the present disclosure, the one or more predefined/predetermined conditions includes a condition that the substitute MV positions are available and/or are stored in the buffer.

According to one exemplary embodiment of the present disclosure, the substitute MV positions are determined to fulfill the condition that a distance between the substitute MV positions and the excluded MV positions is shortest.

The term "distance" refers to a measure for the magnitude of a spatial separation between two points along a certain direction. The spatial separation may be in units of the number of pixels (or samples) along the pixel x and/or pixel y direction, using the pixel as unit for the spatial measure. The distance may be calculated according to a metric, for example, an Euclidean and/or the p-norm with p equal to or larger than one.

The "distance" condition is one example of a predetermined condition and is not restricted to this condition. For example, the distance condition may be combined with a distance cutoff corresponding to a threshold value. A discarded position may be replaced by a position located such that the distance is equal to or lower than the cutoff value. In other words, the distance may not be minimal. Other options and or combinations of different conditions may be applicable so as replaced positions are available and/or stored in the buffer.

The position replacement may result, in the best-case scenario, in having the same number of positions as the number of discarded positions, providing an advantageous effect that the number of positions is preserved. Moreover, determining the replaced positions with respect to the distance between replaced positions and discarded positions being shortest may prove an advantage that the spatial location of motion vector candidate positions are close to the shape/structure (shape and/or structure) of the original pattern. Thus, the shortest distance enables the preservation of the shape/structure of the original pattern. As a result, the prediction may be performed accurately and with high precision.

According to an aspect of the present disclosure, the processing circuitry of the apparatus is further configured to determine the MVCs for the current CU including adjusting the excluded MV positions to adjusted MV positions determined so as to be available and/or stored in the buffer.

This means that the discarded pattern positions are subject to adjustment and thus determine adjusted MV positions such that they are available and/or stored in the buffer. Since in this embodiment all of the discarded positions are subject to adjustment, the number of MV candidate positions is the same as the number of pattern positions. In other words, the number of MV positions is preserved.

This may provide an advantage that the prediction is performed with a sufficiently larger number of candidate positions, improving the accuracy of the prediction.

In addition or optionally, two different pattern positions may be substituted by only one position. In this case, the number of MVC positions is reduced by one.

According to one exemplary embodiment of the present disclosure, the determining of the adjusted MV positions includes assigning the excluded MV positions to assigned MV positions along an x direction along a width of the current CTU and/or a y direction along a height of the current CTU.

The x and y direction, respectively, x and y positions are in pixel coordinates with the x pixel axis going along the width of the CTU and the y pixel axis going along the CTU height.

Thus, discarded positions may be assigned to a position for which motion information is available with respect to any of its x and/or y position components. In other words, the position assignment may be performed in any direction.

This may provide an advantage of performing the assignment in a very flexible manner, allowing for a fine-tuning of MV candidate positions. As a result, the prediction accuracy may be improved further due to the spatial fine-tuning of MV candidate positions.

According to another exemplary embodiment of the present disclosure, the determining includes reassigning x positions or y positions of one or more assigned MV positions having the same x position or the same y position to reassigned y positions or x positions using a predetermined prescription.

The prescription may be a function. This means that, for example, the reassigned positions may be calculated using said function with the assigned position as input.

According to an exemplary embodiment of the present disclosure, the predetermined prescription is shifting the y or x components of the assigned MV positions by a predetermined offset value.

The offset value may be a number of pixels so as to shift the y and/or x position (e.g. in pixel units) by the pixel offset by adding and/or subtracting the offset value to the adjusted y and/or x position value. Alternatively, the predetermined prescription may be a factor by which the y and/or x position may be multiplied and/or divided. Other prescriptions are possible for achieving the reassignment of the assigned positions when their x and/or y position is the same.

Thus, the reassignment of positions performed, for example, by shifting any of the x or y components of assigned positions results in a spread of those assigned positions that may have the same x and/or y position. In other words, some of the discarded positions may be located at the same position after the position assignment. The component-wise reassignment of the assigned positions having the same x or y position is spreading these positions to different locations, which are still available and/or stored in a buffer.

This may provide an advantage that position redundancy is avoided as some candidate positions may be located at the same position and thus would provide the same motion information. Spreading of assigned positions thus increases the number of candidate positions that may have different motion information as they are at different positions. Thus, the prediction is performed more accurately with a sufficiently larger number of MV candidate positions.

Once the motion vector candidate positions are determined using any of the above embodiments of the present disclosure, it is checked whether the motion vectors for these candidate positions are already included in the MVC list. If not, then the motion vector is included into the list.

According to an aspect of the present disclosure, an encoder is provided for encoding a current coding unit, CU, of a video frame comprising an apparatus for generating a list of one or more MVCs according to any of the above aspects of the present disclosure; an inter-prediction unit for determining prediction of the current CU according to at least one motion vector, MV, our of the MVCs of said list; and a compression unit for encoding the current CU by using the prediction of the CU.

According to an aspect of the present disclosure, a decoder for decoding a current coding unit, CU, of a video frame comprising an apparatus for generating a list of one or more MVCs according to any of the above aspects of the present disclosure; an inter-prediction unit for determining prediction of the current CU according to at least one motion vector, MV, our of the MVCs of said list; and a decompression unit for decoding the current CU by using the prediction of the CU.

The MVCs may be used for motion prediction utilizing motion information from the motion vectors obtained at the MVC positions. The current CU may be encoded and/or decoded by calculating a difference between the CU and the prediction. Alternatively or in addition, an index to the list of MVCs may be encoded, e.g. even if there is no residual since the prediction is already close to the CU, i.e. the residual is nearly zero. In principle, the index to the list may be also determined implicitly at the encoder and the decoder side.

According to an aspect of the present disclosure, a method is provided for generating a list of one or more motion vector candidates, MVCs, comprising the steps of determining the MVCs for a current coding unit, CU, in dependence on a position of a pattern relative to a position of the current CU, the pattern defining positions of motion vectors, MVs, and the position of the current CU within a coding tree unit, CTU.

According to an aspect of the present disclosure, a computer-readable non-transitory medium is provided for storing a program, including instructions which when executed on a processor cause the processor to perform the method steps.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1A:
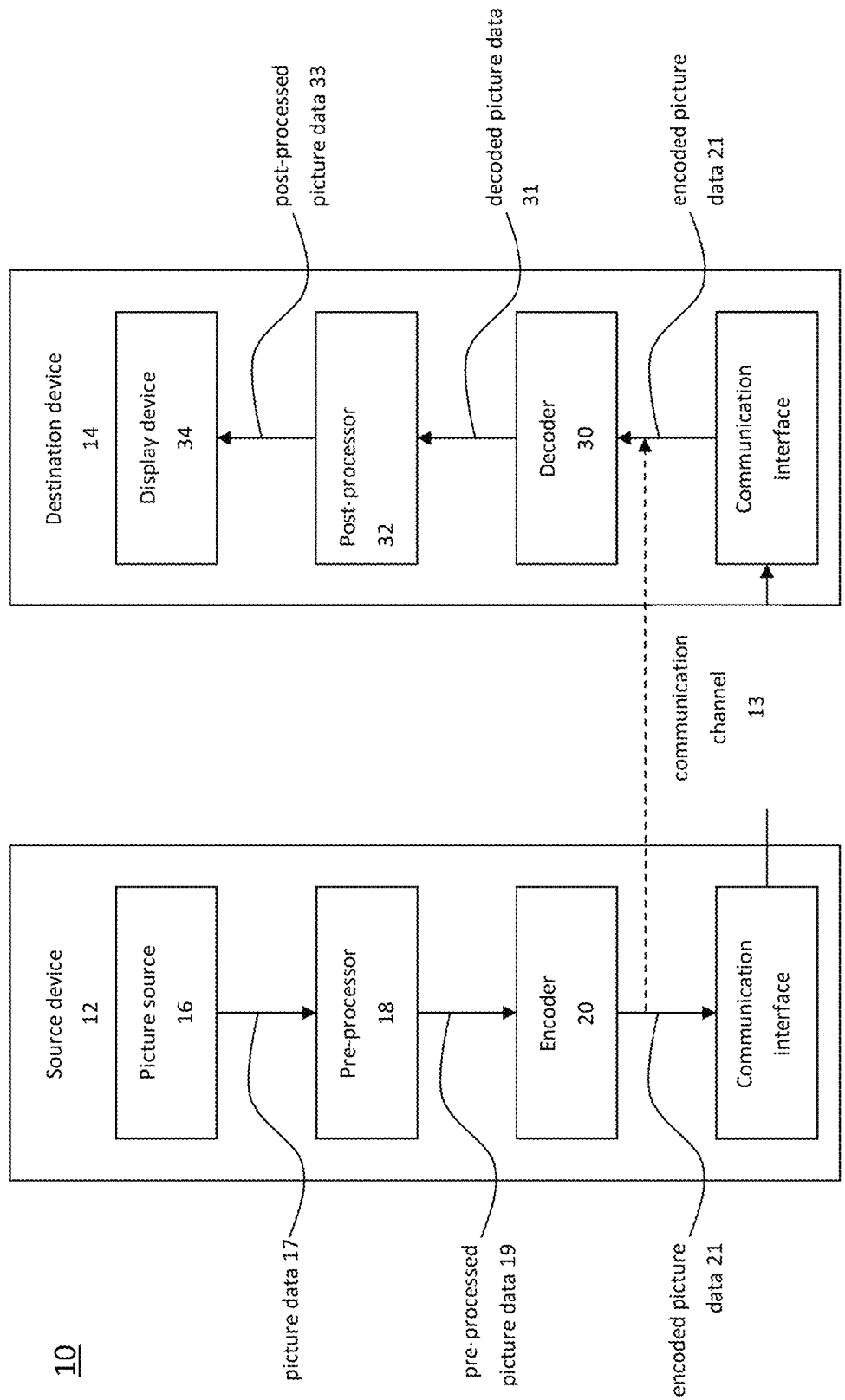
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts: video encoding and video decoding. Video encoding is performed at the source side, typically comprising processing (e.g. by compression) the original video pictures to reduce the amount of data required for representing the video pictures (e.g., for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 to, e.g., a destination device 14 for decoding the encoded picture data 13.

The source device 12 comprises an encoder 20, and may additionally (i.e., optionally) comprise a picture source 16, a pre-processor (or pre-processing unit) 18, a picture pre-processor 18, and/or a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g., a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
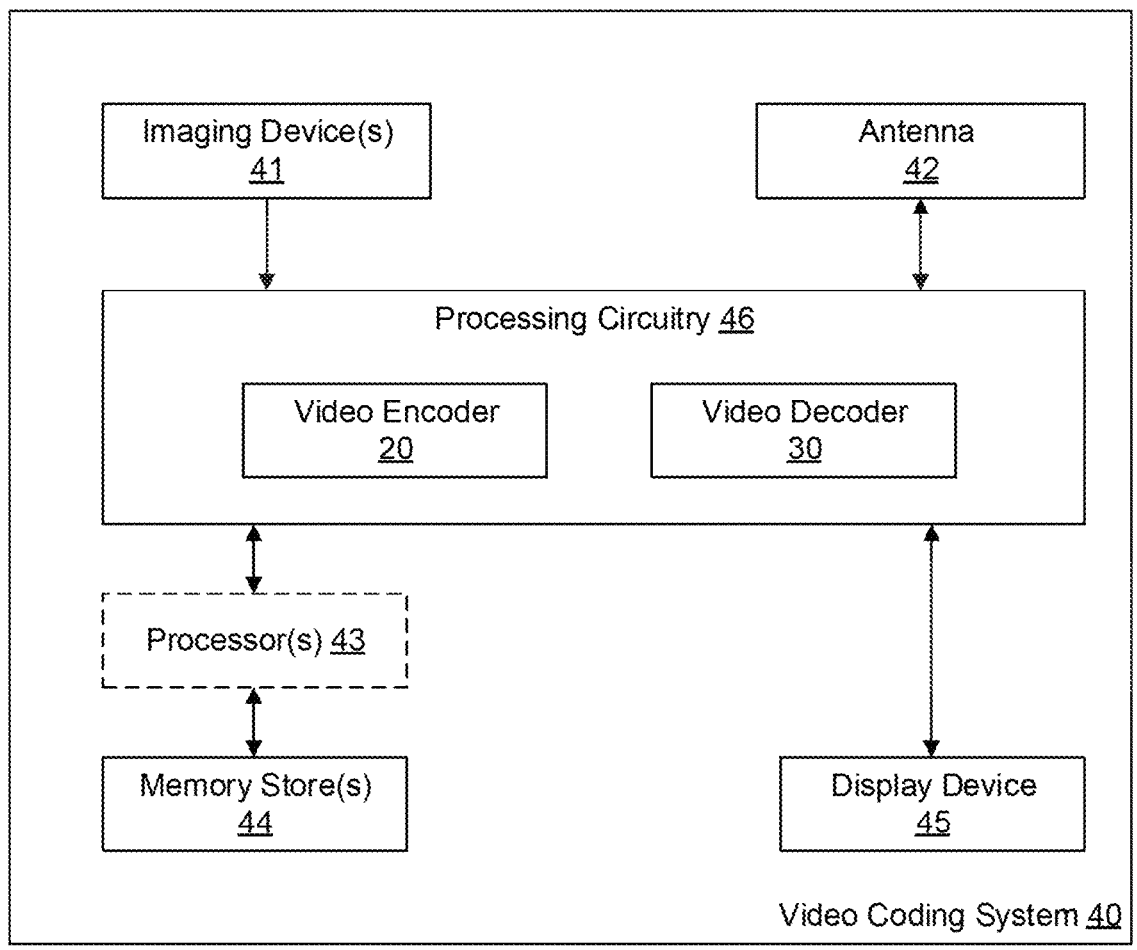
FIG. 1B is a block diagram showing another example of a video coding system configured to implement embodiments of the disclosure.

The encoder 20 (e.g., a video encoder 20) or the decoder 30 (e.g., a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
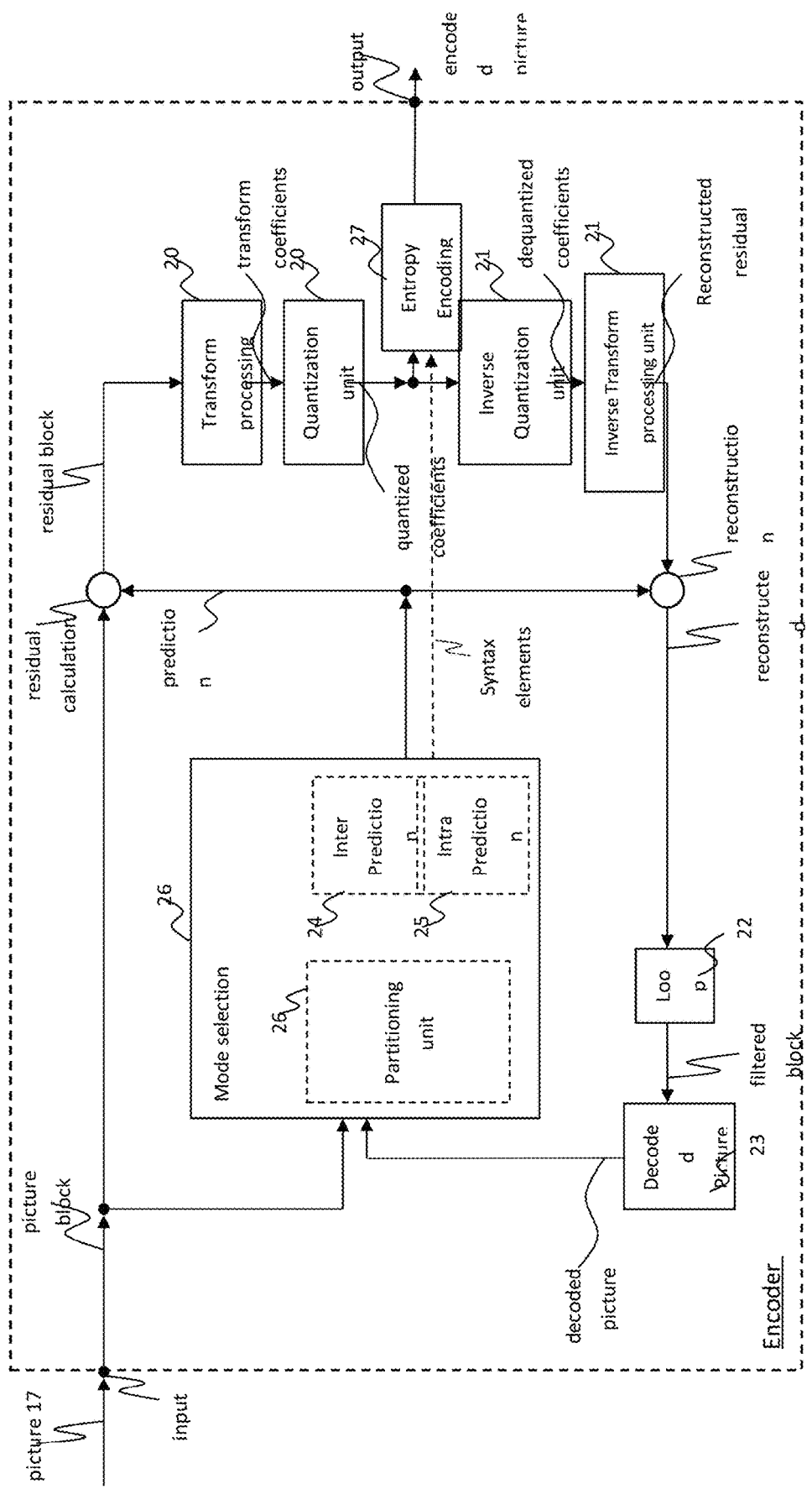
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
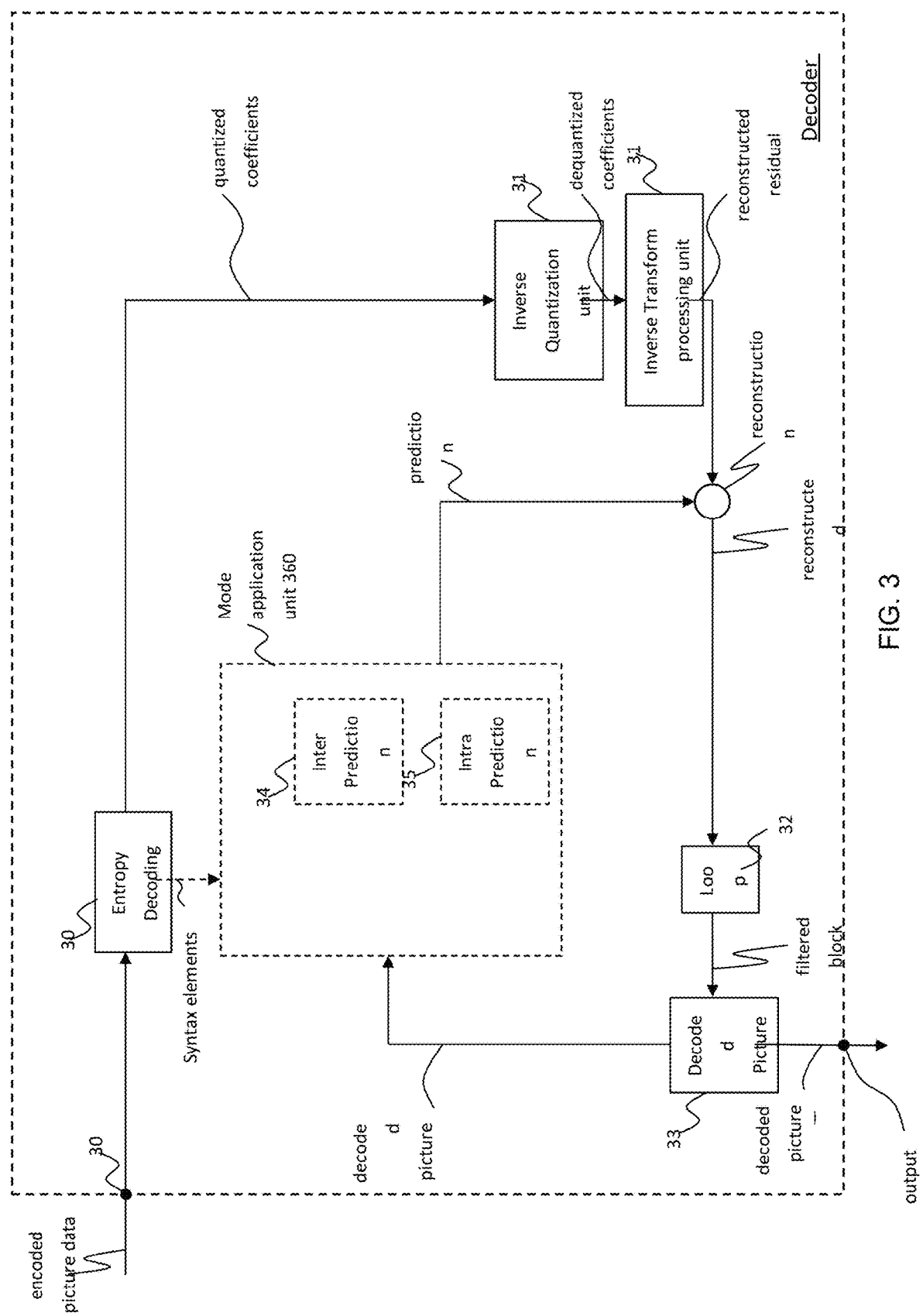
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures and Blocks)

The encoder 20 may be configured to receive (e.g., via input 201) a picture 17 (or picture data 17), e.g., a picture of a sequence of pictures forming a video or video sequence. The received picture 17 or picture data 17 may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g., a luma array in case of a monochrome picture 17, or a luma or chroma array in case of a color picture) or three sample arrays (e.g., a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203. Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain de-quantized coefficients 211, e.g. by applying the inverse of the quantization scheme applied by the quantization unit 208 based on or using the same quantization step size as the quantization unit 208. The de-quantized coefficients 211 may also be referred to as de-quantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding de-quantized coefficients 213) in the sample domain. The reconstructed residual block 213 may also be referred to as transform block 213.

Reconstruction

The reconstruction unit 214 (e.g. adder or summer 214) is configured to add the transform block 213 (i.e., reconstructed residual block 213) to the prediction block 265 to obtain a reconstructed block 215 in the sample domain, e.g., by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g., directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magneto-resistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g., a line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g., an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g., from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g., by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g., at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a CTU may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a CTB may be an N×N block of samples for some value of N such that the division of a component into CTBs is a partitioning. A CU may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a CB may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a CTU is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g., non-directional modes like DC (or mean) mode and planar mode, or directional modes, e.g., as defined in HEVC, or may comprise 67 different intra-prediction modes, e.g., non-directional modes like DC (or mean) mode and planar mode, or directional modes, e.g., as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e., previous at least partially decoded pictures, e.g., stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. For example, a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g., a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g., encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g., a summation unit 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g., reference picture index and motion vector), intra prediction parameter (e.g., intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g., by parsing and/or decoding, e.g. by entropy decoding unit 304) and to apply based on the quantization parameters an inverse quantization on the decoded quantized coefficients 309 to obtain de-quantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive de-quantized coefficients 311, also referred to as transform coefficients 311, and to apply a transform to the de-quantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g. by entropy decoding unit 304) to determine the transform to be applied to the de-quantized coefficients 311.

Reconstruction

The reconstruction unit 314 (e.g., adder or summation unit 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g., a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g., by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (i.e., I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g., motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g., video tile groups) and/or tiles (e.g., video tiles) in addition or alternatively to slices (e.g., video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g., video tile groups) and/or tiles (e.g., video tiles) in addition or alternatively to slices (e.g., video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g., CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g., CTUs) or one or more tiles, wherein each tile, e.g. may be of rectangular shape and may comprise one or more blocks (e.g., CTUs), e.g., complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g., the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux = (mvx + 2^{bitDepth}) \% 2^{bitDepth} \quad (Eq.\ 1)$$

$$mvx = (ux >= 2^{bitDepth-1})?(ux - 2^{bitDepth}):ux \quad (Eq.\ 2)$$

$$uy = (mvy + 2^{bitDepth}) \% 2^{bitDepth} \quad (Eq.\ 3)$$

$$mvy = (uy >= 2^{bitDepth-1})?(uy - 2^{bitDepth}):uy \quad (Eq.\ 4)$$

where mvx is a horizontal component of a motion vector of an image block or a sub-block, mvy is a vertical component of a motion vector of an image block or a sub-block, and ux and uy indicates an intermediate value. For example, if the value of mvx is $-32769$, after applying formula (1) and (2), the resulting value is 32767. In computer system, decimal numbers are stored as two's complement. The two's complement of $-32769$ is 1,0111,1111,1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2^{bitDepth}) \% 2^{bitDepth} \quad (Eq.\ 5)$$

$$mvx = (ux >= 2^{bitDepth-1})?(ux - 2^{bitDepth}):ux \quad (Eq.\ 6)$$

$$uy = (mvpy + mvdy + 2^{bitDepth}) \% 2^{bitDepth} \quad (Eq.\ 7)$$

$$mvy = (uy >= 2^{bitDepth-1})?(uy - 2^{bitDepth}):uy \quad (Eq.\ 8)$$

The operations may be applied during the sum of mvp and mvd, as shown in formula (5) to (8).

Method 2: remove the overflow MSB by clipping the value $$vx = Clip3(-2^{bitDepth-1}, 2^{bitDepth-1}-1, vx) \quad (Eq.\ 9)$$

$$vy = Clip3(-2^{bitDepth-1}, 2^{bitDepth-1}-1, vy) \quad (Eq.\ 10)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$Clip3(x, y, z) = \begin{cases} x & ;\ z < x \\ y & ;\ z > y \\ z & ;\ \text{otherwise} \end{cases} \quad (11)$$

Figure 4:
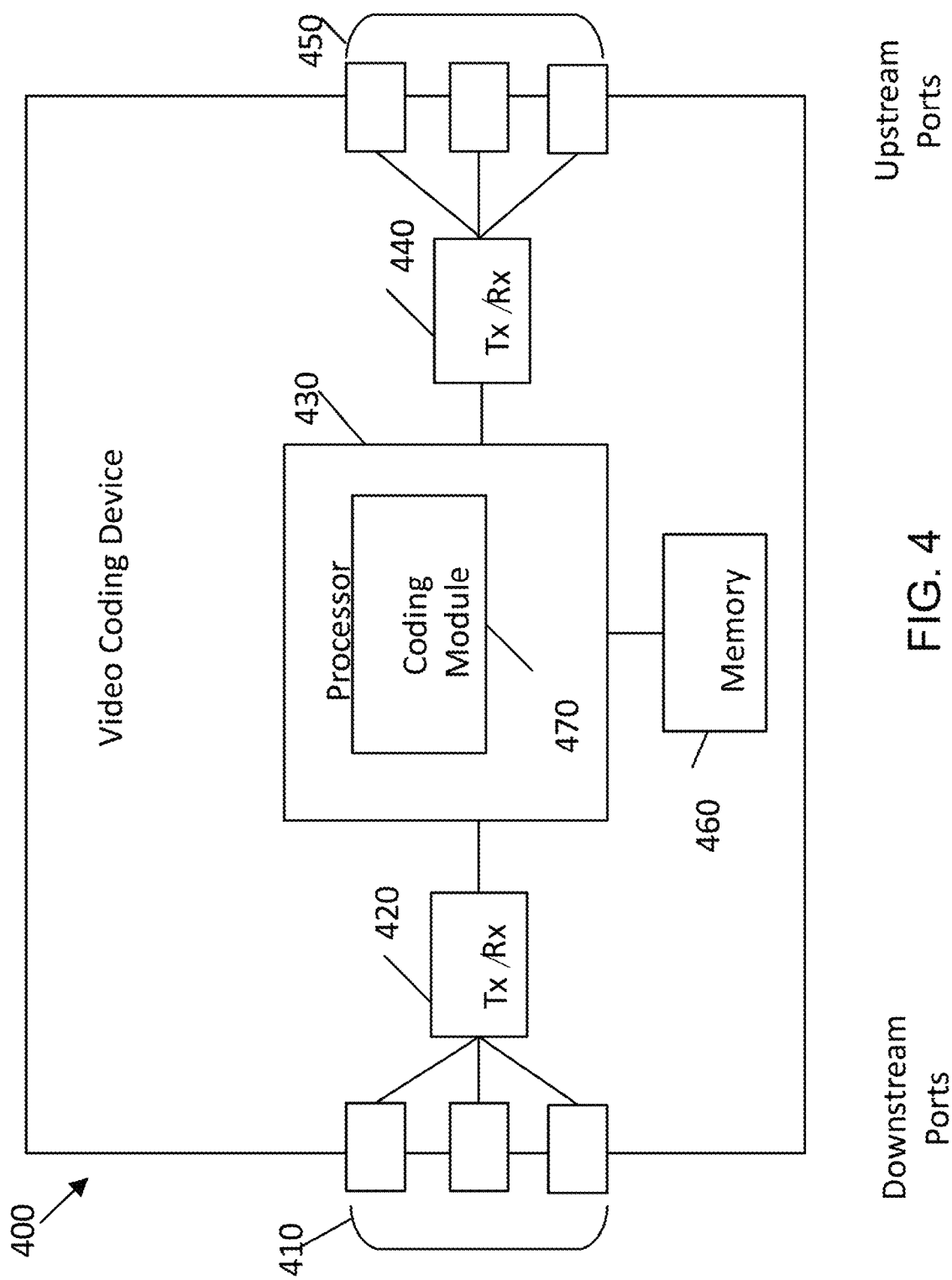
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
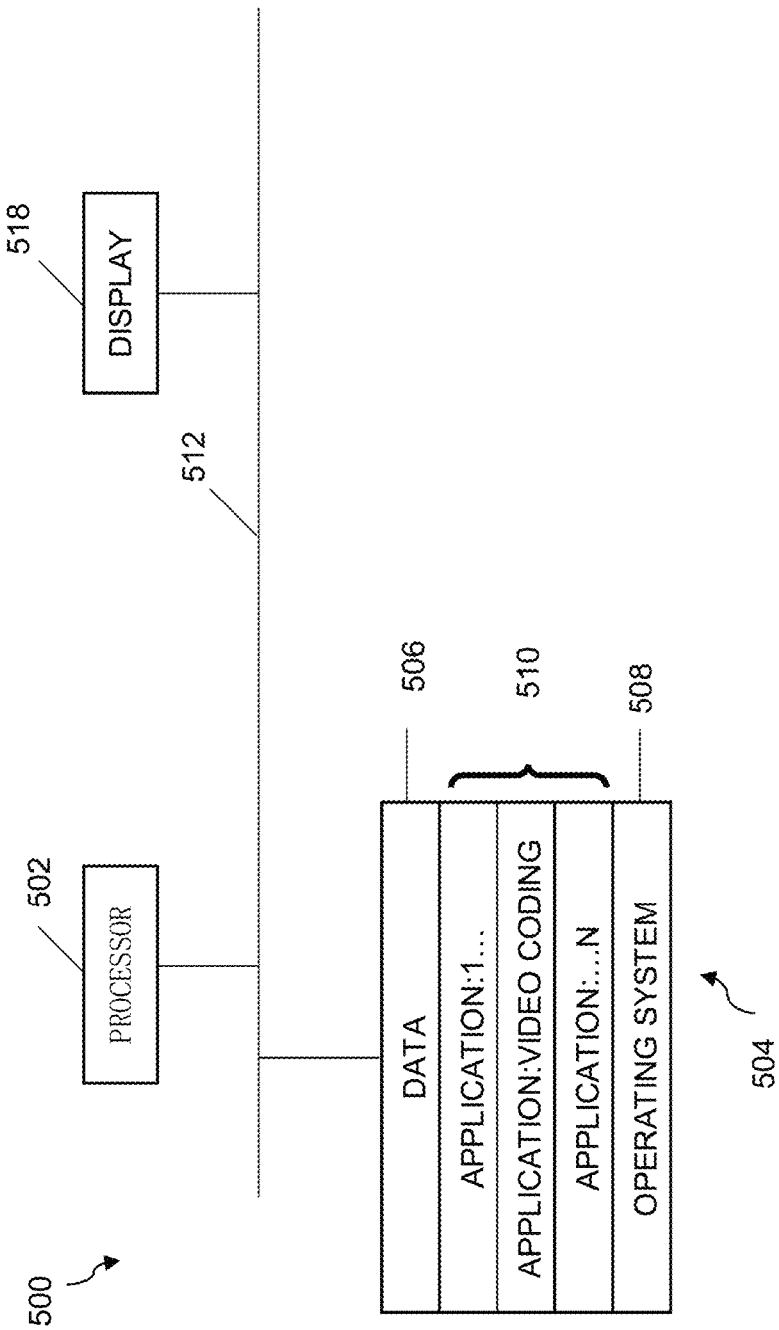
FIG. 5 is a block diagram illustrating another example of an encoding apparatus or a decoding apparatus.
Figure 6:
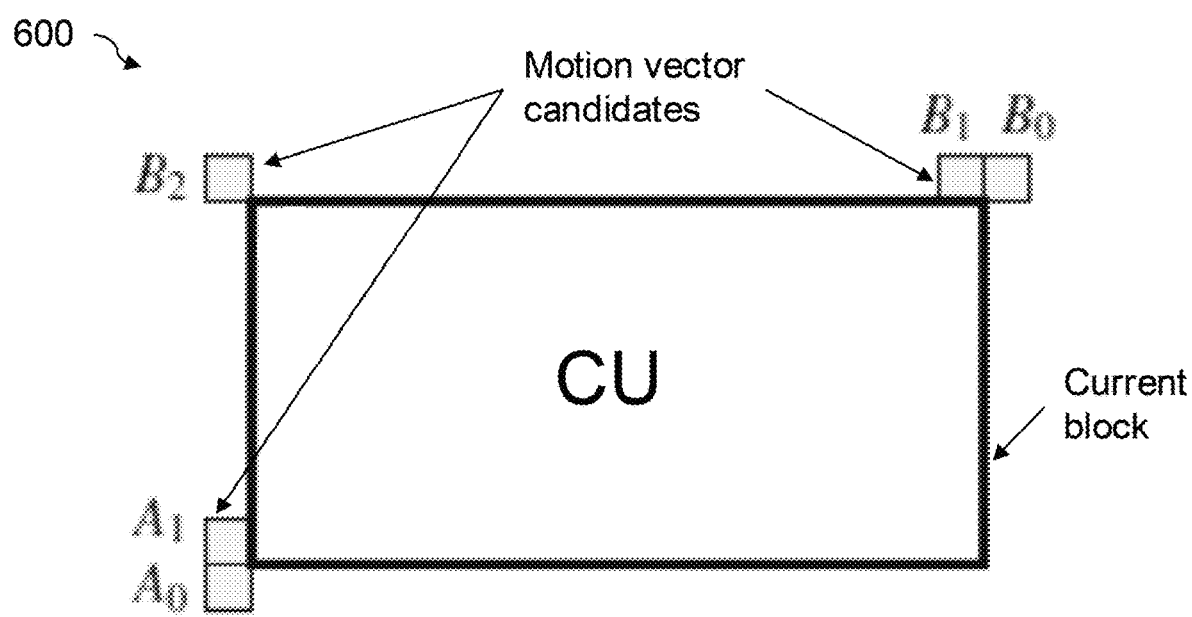
FIG. 6 is an example of locations for spatial MVP candidates (for merge mode) in the HEVC standard.
Figure 7:
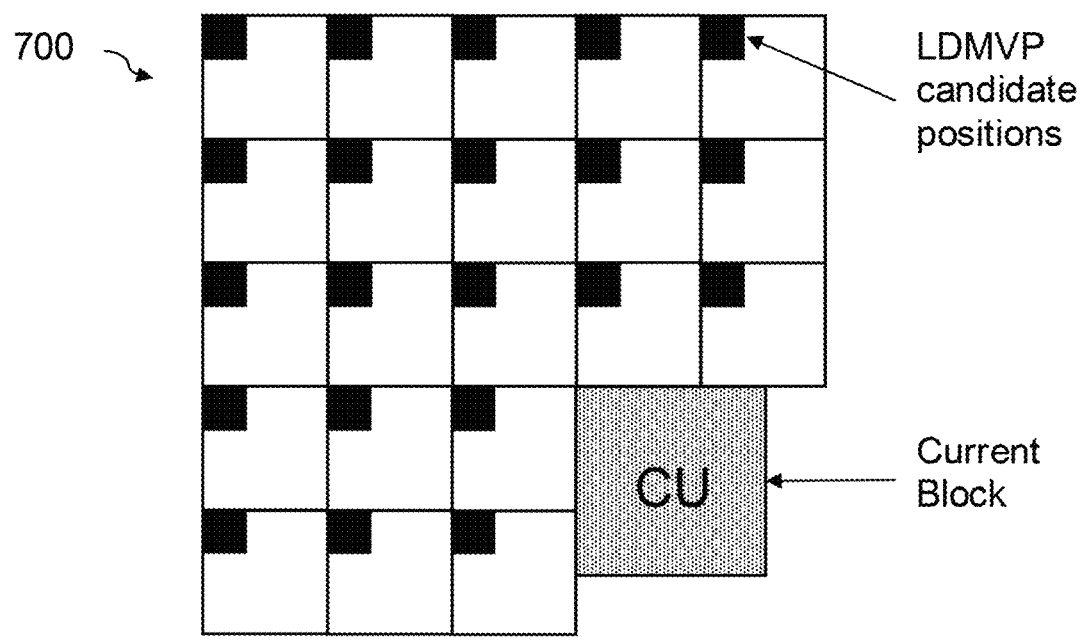
FIG. 7 is an example of a LDMVP pattern referred to as "square" LDMVP pattern.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

The generation of a LDMVP list requires access to a significant amount of motion information of non-adjustment coding units. That may be critical in case of MVP position is outside of current CTU. Indeed, currently processed CTU information may be stored in a cache while the previously processed CTU may be stored in an external memory. Thus, retrieving information from another than the current CTU may require access to the external memory that increases the delay and the power consumption. Furthermore, retrieving motion information from e.g. the top CTU may be more complex than capturing motion information from the left CTU, which is previous in the processing order and may be also stored in the cache.

Due to these reasons, a modification of the LDMVP pattern may be advantageous in order to limit the access to other CTUs.

In proposals to VVC standardization such as JVET-J0012, JVET-J0021, JVET-J0029, JVET-J0058, and JVET-J0059, for example, the use of motion information from non-adjustment blocks has been proposed. In the present disclosure, spatial MVP candidates that are captured from such blocks are denoted as Long-Distance Motion Vector Prediction (LDMVP) candidates. The positions of LDMVP candidates are usually obtained using some pattern.

In this disclosure, a LDMVP pattern is defined as a set of offsets (e.g. in pixels or other basic units) relative to the position of the current block. The position of a current block means the position of the top left sample of the current block. In other words, an offset or offset value refers to a position relative to a reference position.

In the present disclosure, the above-mentioned position of the top-left sample of the current block or CU is used as reference position. The reference position is, however, not restricted to the top-left sample position. Alternatively, any other sample position may be used as a reference. This includes, for example, the sample positions at the top-right, bottom-left, and/or bottom-right of the current CU. Another option is using as reference position a sample position along any of the top, bottom, left, and/or right edges of the current CU.

Some examples of LDMVP patterns are depicted in FIGS. 7 to 10, which are referred to as "square", "diagonal", "triangle, and "star" LDMVP pattern throughout this application. The patterns shown are not limited to the ones of FIGS. 7 to 10. Rather they are used here for illustration purposes to exemplify how LDMVP patterns (i.e. the respective pattern positions) serve as a source for initial positions for motion vectors and, after tentative additional checks of the pattern positions including substituting pattern positions and/or adding pattern positions, final positions may be obtained. The final positions are then used to obtain the respective motion information (i.e. the motion vector) from these final positions. These final positions along with their motion information are referred to as LDMVP patterns with restricted motion vector positions.

Figure 11:
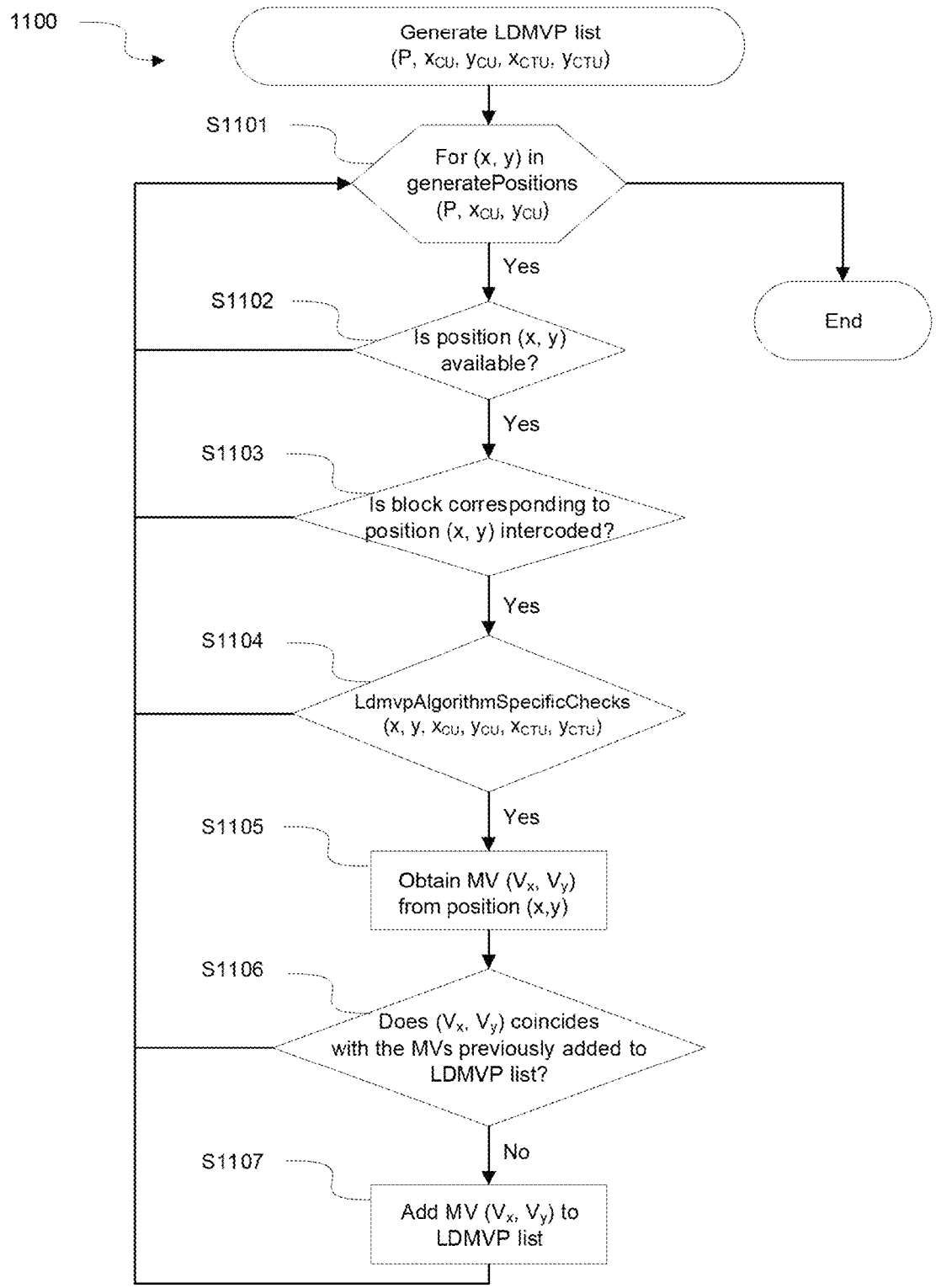
FIG. 11 is a flowchart of the LDMVP list generation algorithm.

Some positions defined by the pattern may not be available, because they are, for example, outside of a current picture or current slice, or may correspond to intra coded units or may be rejected for some other reasons. Therefore, the set of candidate's positions is a subset of the positions defined by the pattern. Going through the candidate's position set according to the predefined order, a final LDMVP candidates list is generated. A block scheme of the LDMVP list generation algorithm is depicted in FIG. 11. The input parameters for this algorithm are: pattern P, CU position ($x_{CU}$, $y_{CU}$) and CTU position ($x_{CTU}$, $y_{CTU}$).

Hereinafter, it's assumed that the CTU width and height are predefined parameters available in the LDMVP algorithms. The output of the LDMVP list generation algorithm is a LDMVP candidates list. The procedure generatePositions(P, $x_{CU}$, $y_{CU}$) generates positions (x,y), using ($x_{CU}$, $y_{CU}$) as a basic point and offsets from the pattern P in order depending on candidates priorities. The priority here refers to the order of the candidates in which they are inserted into the MVC list. Before adding new candidate to the list, it's checked that the new candidate does not coincide with the candidates that are already in the list. For some modifications of the LDMVP algorithms, additional checks may be performed using the procedure LdmvpAlgorithmSpecificChecks(P, $x_{CU}$, $y_{CU}$, $x_{CTU}$, $y_{CTU}$).

In the following, the method steps of the LDMVP list generation algorithm is briefly summarized with reference to the flowchart of FIG. 11. In step S1101, it is checked whether a position (x,y) belongs to a pattern relative to a current CU position (xcu,ycu). In step S1102, it is checked whether the position (x,y) is available. If not, then the next position (x,y) is used. If yes, it is then checked whether a block corresponding to the position (x,y) is inter-coded (step S1103). If not, then the next positon (x,y) is subject to the above mentioned two tests of steps S1101 and S1102. If yes, the position (x,y) may be subject to specific checks performed (step S1104) by the procedure LDMVPAlgorithmSpecificChecks, which as input parameters x,y,xcu,ycu,xctu, and yctu. In step S1105, motion information is then obtained for the position (x,y). This means that a motion vector is obtained for the position (x,y). It is then checked (step S1106), whether the obtained motion vector MV with components Vx and Vy coincides with any of the MVs added previously to the LDMVP list. If the MV is the same with any of the previous MV in the list, then a next position (x,y) is subject to the checks starting from step S1101. If the MV is not in the list, the MV is added into the LDMVP list (step S1107). When all positions (x,y) have been checked through the steps S1101 to S1107, the algorithm ends and provides the LDMVP list as output. The check of step S1106 of whether an obtained MV coincides with the MVs already in the MVC list is also referred to a full pruning. This means that an obtained MV is checked against all of the MVs already in the MVC list.

The flowchart of the LDMVP list generation algorithm shown in FIG. 11 is an exemplary implementation. For example, in the flowcharts of FIGS. 13 and/or 19 with the procedures additionalChecks and/or replacePosition being inserted into the flowchart of the LDMVP list generation algorithm, step 1106 may be optionally skipped entirely. This means that all of the MVs corresponding to the MV candidate positions may be included into the MVC list. Alternatively, step S1106 may be performed partly. This means that, for example, an obtained MV is checked against a part of the MVs already in the MVC list. This partial check refers to partial pruning. In one example, the partial pruning may be performed against to the MVs of the MVC list (e.g., a number of N MVs), which have been included most recent. These recently added MVs are referred to as first MV candidates.

As described in the following, the LDMVP list generation algorithm of FIG. 11, may be amended by any of the methods of the present disclosure. The method steps of the LDMVP list generation algorithms are not repeated, but rather the method steps related to the present disclosure are discussed further.

As disclosed in the following exemplary embodiments of the disclosure, the present disclosure exploits a generated motion vector candidate list of motion vector positions, from which the respective motion information is used for the motion prediction.

The prediction may be for a current block, i.e., a current coding unit CU, which is within a current coding tree unit CTU. The current CTU may be within a current frame, i.e. current video frame, comprised of multiple CTUs.

According to an embodiment, an apparatus is provided for generating a list of one or more motion vector candidates, MVCs. The MVC list is generated for a current coding unit CU in dependence on a position of a pattern relative to a position of the current CU and in dependence on the position of the current CU within a coding tree unit, CTU. The pattern defines positions of motion vectors, MVs.

The motion vector candidates are used for the motion prediction for the current CU. This means that the motion information of motion vectors are used at the respective candidate positions for the prediction. Thus, the motion vector positions are positions of the corresponding vector candidate block. The block may by one pixel/sample and/or a plurality of samples corresponding to a block of samples.

The position of the current CU may be the top-left corner of the current CU, with the positions being in units of pixels or a pixel block unit. The block unit may, for example, be a 2×2 pixel block or any other unit. The position of the current CU, with the CU being within the current CTU, may be a distance of the top-left corner of the current CU to a (pixel/sample) position of the top-left corner of the current CTU.

In other words, the term "motion vector position" may refer to a "position of motion vector candidate block" or a "position of motion candidate block". Moreover, more than one position of the pattern may correspond to one CU, such as in the case when the grid size is 16×16 and neighboring CU size is 128×128 or 64×64, for example. This happens in case the grid size is (much) less than the size of the neighboring CU(s), so that a few pattern positions may be located inside the same neighboring CU. In most cases, only one MV-MV pair correspond to one CU, so that a few pattern positions may refer to the same motion information.

In general, the pattern may be generated on a CU-basis and/or on a grid-basis. In practice, CU-based patterns turn out to be complicated to be handled by the decoder and do not necessarily provide significant gain. Therefore, grid-based patterns are likely to be preferred over the CU-based patterns. For this case, more than one position in the pattern may correspond to one CU.

The LDMVP techniques may be used, for example, for two processes:
1. Merge mode
2. Motion vector prediction in AMVP (advanced motion vector prediction) mode.

For the first case, two things are borrowed from the respective MV candidate position: motion vector and reference index. In case of a B-frame, this may be 2 MVs and 2 reference indices.

For the second case, only a motion vector is borrowed, while a reference index is signaled in a bitstream. LDMVP may be also optionally used for the second case (AMVP). Thus, in general, a LDMVP of the present disclosure may be used for motion prediction and/or motion vector prediction. Moreover, for the prediction not only motion vectors may be used, but also reference indices from a "reference" block, which may be a MV candidate position.

According to an embodiment, the processing circuitry of the apparatus determines the MVCs for the current CU including selecting a subset of MV positions from the pattern positions. In other words, the initial pattern, i.e. the initial positions are subject to additional checks, upon which certain pattern positions may be retained, discarded, and/or altered.

The selecting of the subset from the (initial) pattern is explained in the following with reference to FIGS. 14 to 17 showing examples for the position selection. In the examples of FIGS. 14 to 17, the LDMVP pattern "diagonal" of FIG. 8 has been used throughout for illustration purposes. Any other pattern, such as those shown in FIGS. 7, 9, and/or 10 may be used, including the "sun" pattern (not shown explicitly) that may be retrieved, for example, from FIG. 24.

According to one embodiment, the selecting includes selecting from the pattern positions those MV positions which are within the current CTU.

Figure 14:
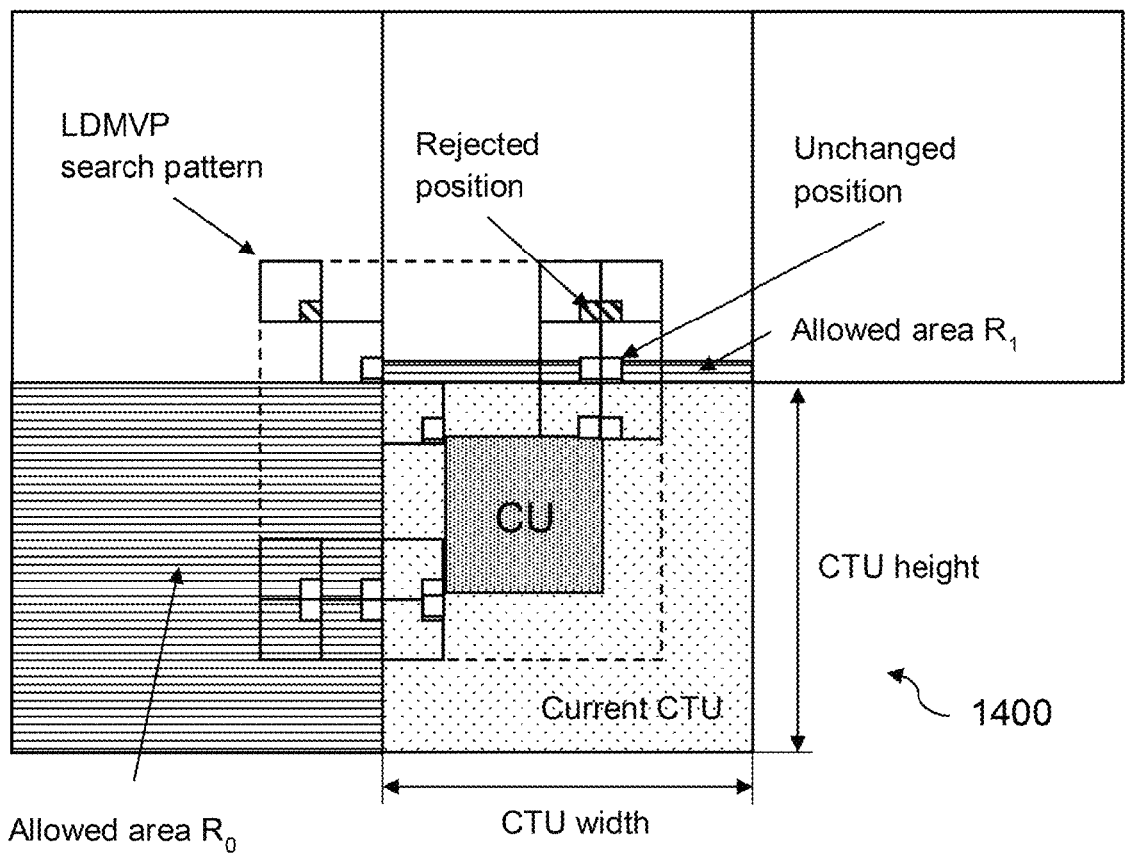
FIG. 14 is a first example to illustrate the application of the additionalChecks procedure on the "diagonal" pattern.

This may be seen in FIG. 14 by the marked white squares of pattern positions, which are located inside the current CTU (coarse dotted square). For these points, motion information is available. The pattern positions remain unchanged (white squares).

According to an embodiment, the selecting of the subset of MV positions is performed by excluding from the pattern positions those MV positions which are not available and/or are not stored in a buffer.

This means that positions may lie outside of a current video frame, i.e., the position is larger than the size of the current frame. Thus, information for that point does not exist. Motion information may also not be available at a position as result of a encoding/decoding order performed for the CUs of the frame. In other words, motion information at the bottom right region of a CTU does not yet exist at a specific time as this region is subject to encoding/decoding at a later time. Thus, even if a position in that region is generated (i.e. is part of the pattern), motion information is not present at that point at that time. Moreover, motion information may also not be stored in a memory (i.e., the buffer) as that the respective information may be accessed. Such a buffer may, for example, be a line buffer which has fast read-write access times and is commonly used to store motion information of restricted regions of CTUs neighboring the current CTU for which the motion prediction is performed.

A line buffer is a buffer for storing data from CTUs. In versatile vide coding (VVC), CTUs are decoded in a raster order (inside one tile/brick). For some tools, for example, for merge mode data from top CTUs is needed. For this purpose, all the data that may be potentially needed from bottom CTUs during the decoding of a current CTU, is stored in specific buffer. This buffer is called "line buffer". For motion information, including MVs and reference indices, the prediction of the bottom line of motion information is stored in the line buffer. Without the use of LDMVP, in the worst case, the amount of number_of_CTUs_in_a_line*CTU_size/motion_information_storage_grid_size elements should be stored in the line buffer (for the regular merge, that can use neighboring CU from the top CTU).

When the LDMVP pattern is not restricted, much more than just one line of MVs have to be stored. This, however, is not acceptable for the hardware implementation.

Thus, according to the present disclosure, the use of LDMVP pattern for restricting the use of motion information requires storing of a less amount of motion information in the line buffer. Thus, the prediction may be performed more efficiently and fast.

For these cases, some positions of the pattern are excluded, as illustrated in FIG. 14. The coarsely dotted square is the current CTU, which entails a current CU (fine dotted square). The regions R0 and R1 (horizontally line pattern) refer to allowed areas, defining positions of motion vectors for which motion information is available.

As can be seen in FIG. 14, a few of the pattern positions located outside of the current CTU are discarded. These are those outside-CTU located pattern positions that also lie not in any of the allowed regions $R_0$ and/or $R_1$ (black-white hashed square). This means that discarded positions are rejected entirely from the pattern and not considered further for motion vector candidate positions in this embodiment.

As for the other pattern positions, for which motion information is available as they lie within any of the regions $R_0$ or $R_1$, they are retained from the pattern and their positions are not changed (white squares).

Figure 15:
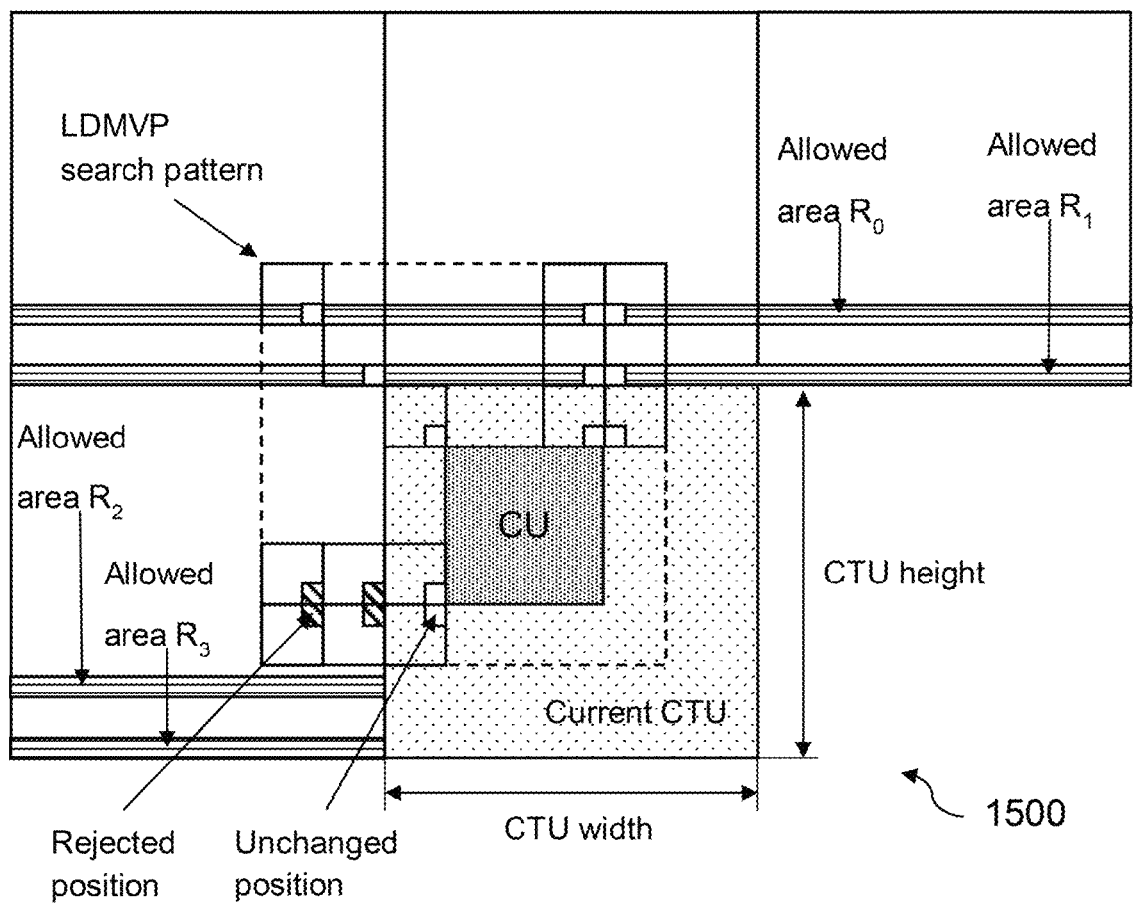
FIG. 15 is a second example illustrating the application of the additionalChecks procedure on the "diagonal" pattern.
Figure 16:
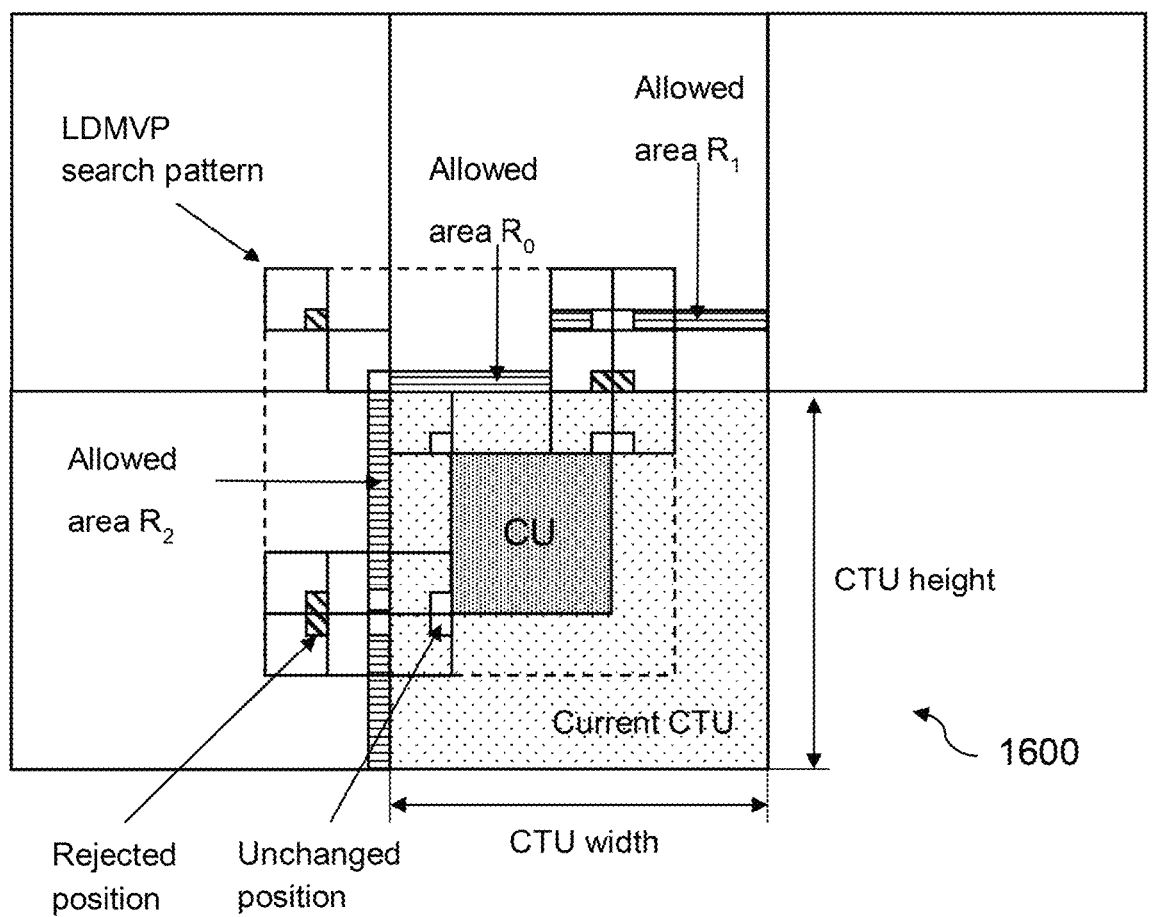
FIG. 16 is a third example illustrating the application of the additionalChecks procedure on the "diagonal" pattern.
Figure 17:
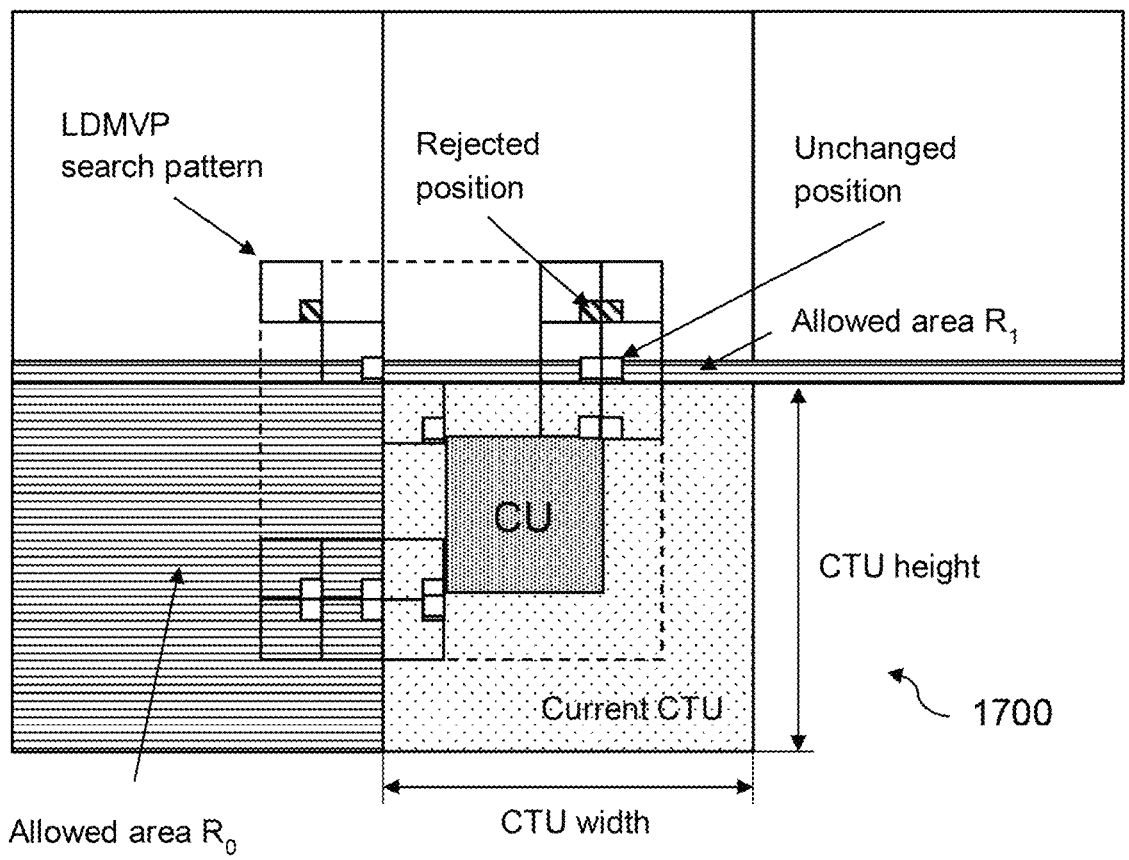
FIG. 17 is a fourth example illustrating the application of the additionalChecks procedure on the "diagonal" pattern.

FIGS. 15 to 17 show examples for the selection of pattern positions as discussed above for the same "diagonal" pattern, but regions of allowed motion vectors $R_0$, $R_1$, or $R_3$ arranged differently within CTUs neighboring the current CTU. As can be seen from FIGS. 14 to 17, in each case the final list of candidate positions as result of the additional checks, is different because the pattern positions relative to the regions $R_0$, $R_1$, or $R_3$ varies with the different arrangement of the regions within the neighboring CTUs. As clear for a skilled person, the results of the final list will also change with the pattern having different positions as exemplified by the patterns shown in FIGS. 7 to 10.

Figure 13:
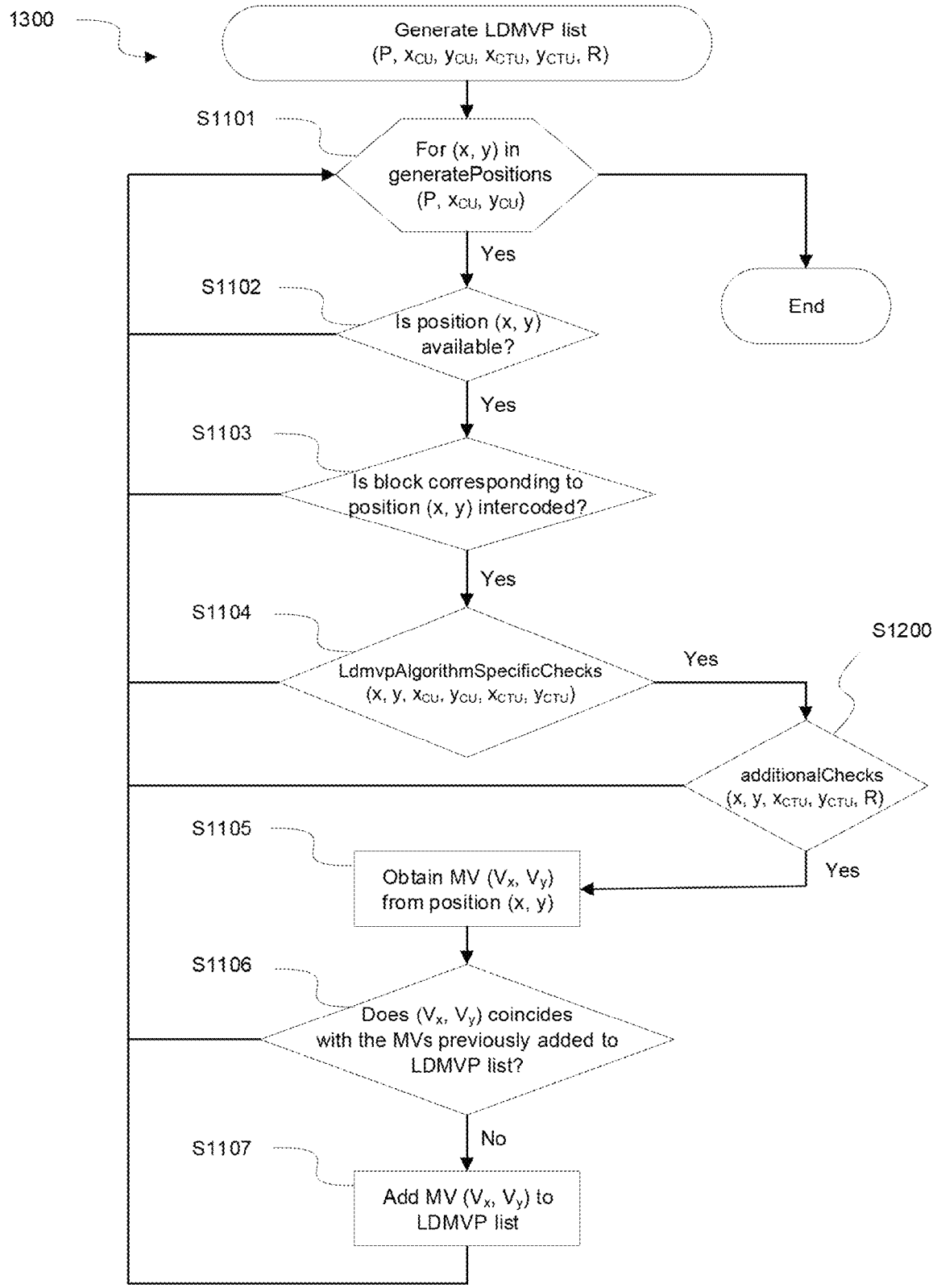
FIG. 13 is a flowchart of the LDMVP list generation algorithm, amended by the procedure additionalChecks.

In an exemplary embodiment of the present disclosure, a procedure additionalChecks(x, y, $x_{CTU}$, $y_{CTU}$, R), which performs these checks discussed above, may be added to the LDMVP list generation algorithm, shown by the flowchart of FIG. 13. This routine is added, before the actual motion information is obtained based on the motion vector candidate list positions.

The input parameters for this procedure are: tested position (x,y), current CTU position ($x_{CTU}$, $y_{CTU}$), and a set R of rectangles defining areas in CTU's around the current CTU. Any of these areas correspond to a region defining positions of allowed motion vector candidates, which may be used for the prediction.

Figure 12:
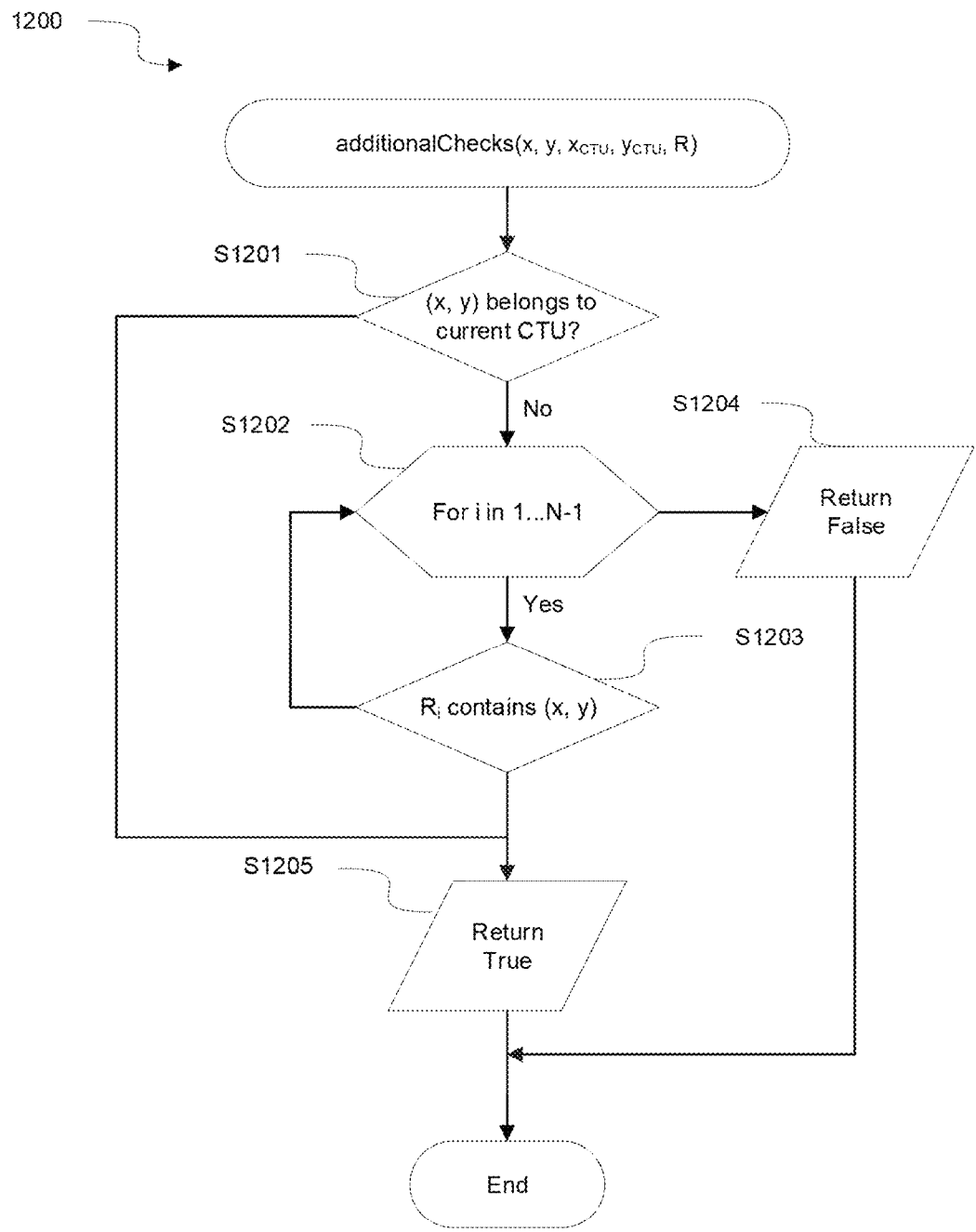
FIG. 12 is a flowchart of the procedure additionalChecks.

FIG. 12 shows the additionalChecks(x, y, $x_{CTU}$, $y_{CTU}$, R) procedure performing a check whether a given position (x,y) belongs to either the current CTU or to one of rectangles $R_i$, (steps S1201 and S1203). The check S1203 is performed for all the rectangle regions $R_i$ (step S1202). If not, then the position (x,y) is rejected (step S1204). This means that the position is discarded. If yes, the position (x,y) is accepted (step S1205).

The exemplary implementation of the LDMVP list generation algorithm comprising the additional check is depicted by the flowchart in FIG. 13. With respect to the method steps S1101 to 1107 of the LDMVP list generation algorithm, the method steps of the additionalChecks procedure is included as step S1200 into the flowchart of FIG. 13. The set R may be empty, which means that the procedure checks only whether or not the given position belongs to the current CTU.

Figure 8:
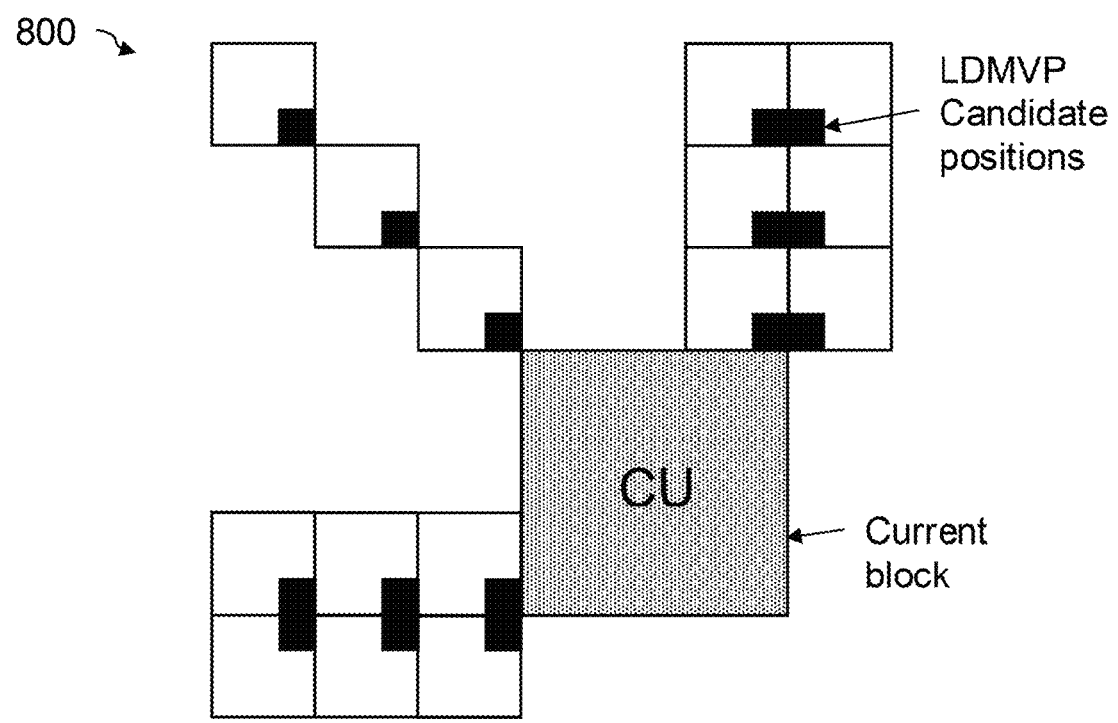
FIG. 8 is an example of a LDMVP pattern referred to as "diagonal" LDMVP pattern.
Figure 9:
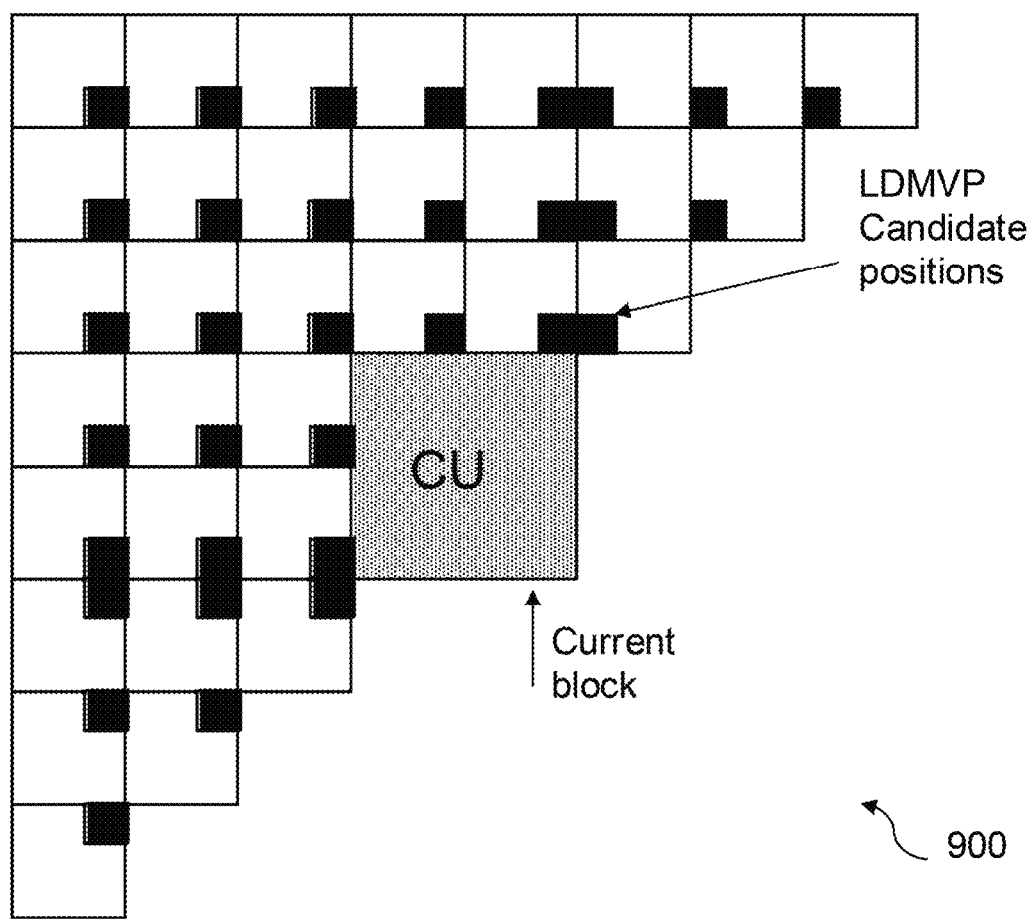
FIG. 9 is an example of a LDMVP pattern referred to as "triangle" LDMVP pattern.
Figure 10:
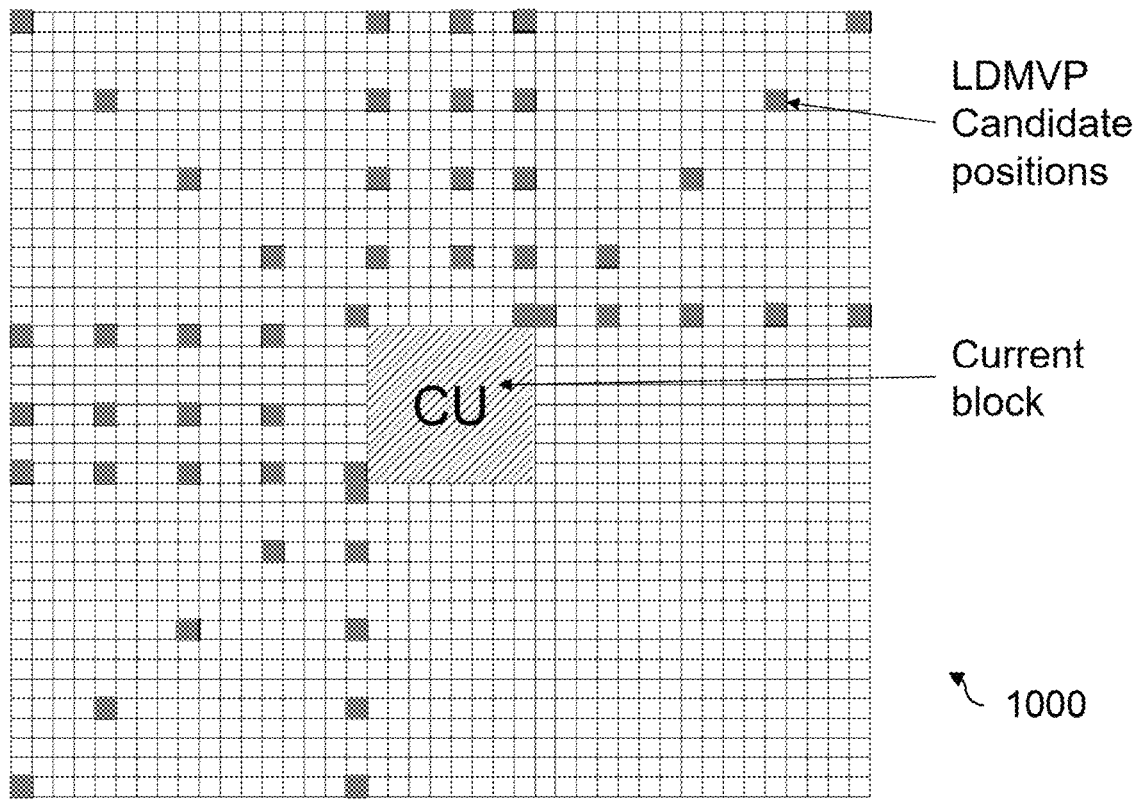
FIG. 10 is an example of a LDMVP pattern referred to as "star" LDMVP pattern.

FIGS. 14 to 17 show some examples illustrating the application of the additionalChecks procedure to the "diagonal" pattern depicted in FIG. 8. Specifically, for the examples of FIGS. 14 to 17, the CU position is (16, 16) pixels relative to the CTU position ($x_{CTU}$, $y_{CTU}$). The rectangles $R_i$ in these examples are set as $[x^0_i, y^0_i, w, h]$, where ($x^0_i, y^0_i$) is a top left position of the rectangle relative to ($x_{CTU}$, $y_{CTU}$), w and h is rectangle's width and height respectively.

Table 1 provides for each of examples 1 to 4 (i.e., FIGS. 14 to 17) the respective settings for the rectangles R that matches the rectangle sets $\{R_i\}$ and the figures, illustrating the application of the additionalChecks procedure to the "diagonal" pattern. The positions that are rejected by the additionalChecks procedure are marked in black-white hashed. The rectangles R are marked with a horizontal line pattern.

TABLE 1 additionalChecks procedure applied on examples 1 to 4

| Example number | Rectangles set $\{R_i\}$ | FIG. |
|---|---|---|
| 1 | $R_0$ = [−ctuWidth, 0, ctuWidth, ctuHeight]<br>$R_1$ = [−1, −1, ctuWidth + 1, 1] | FIG. 14 |
| 2 | $R_0$ = [−ctuWidth, −16 − 1, 3 *ctuWidth, 1]<br>$R_1$ = [−ctuWidth, −1, 3 *ctuWidth, 1]<br>$R_2$ = [−ctuWidth, ctuHeight − 16 − 1, ctuWidth, 1]<br>$R_3$ = [−ctuWidth, ctuHeight − 1, ctuWidth, 1] | FIG. 15 |
| 3 | $R_0$ = [−1, −1, ctuWidth/2 + 1, 1],<br>$R_1$ = [ctuWidth/2, − 16 − 1, ctuWidth − ctuWidth/2, 1]<br>$R_2$ = [−1, 0, 1, ctuHeight] | FIG. 16 |
| 4 | $R_0$ = [−ctuWidth, 0, ctuWidth, ctuHeight]<br>$R_1$ = [−ctuWidth, −1, 3 *ctuWidth, 1] | FIG. 17 |

In many cases, example 4 is advantageous in practice because the CTU left to the current CTU and the bottom line of the CTUs directly to the top of the current CTU are used as allowed regions for motion prediction of the current CU. In other words, as for the bottom line of these CTUs only a restricted number of motion information is utilized for the motion prediction. This makes the motion prediction more efficient and fast as only a limited number of motion vectors are used. This choice is motivated by the presumption that in particular motion information from the top CTUs neighboring the current CTU contribute mainly to the motion prediction. In regular merge, only the right column of motion information from the left CTU is used. When selecting regions of neighboring CTUs, an additional criteria to consider may that storing of the left CTU is easier than storing of the top CTU, because additional buffer size does not grow with the width of the frame.

So far, the pattern positions outside the current CU and not being available and/or stored in a buffer (e.g. not inside any of the regions $R_i$) are discarded. However, the discarded positions may be still exploited for the motion prediction, as discussed next, with reference to FIGS. 18 to 23.

According to an embodiment, the processing circuitry of the apparatus determines the MVCs for the current CU including replacing one or more of the excluded MV positions by substitute MV positions determined in dependency on the excluded MV positions so as to fulfill one or more predetermined conditions.

This means that one or more of the excluded/discarded pattern positions may be subject to changes of their coordinate positions such as by replacing or calculating of new positions under the constraints of predetermined conditions.

According to an embodiment, the one or more predefined conditions includes a condition that the substitute MV positions are available and/or are stored in the buffer.

Figure 20:
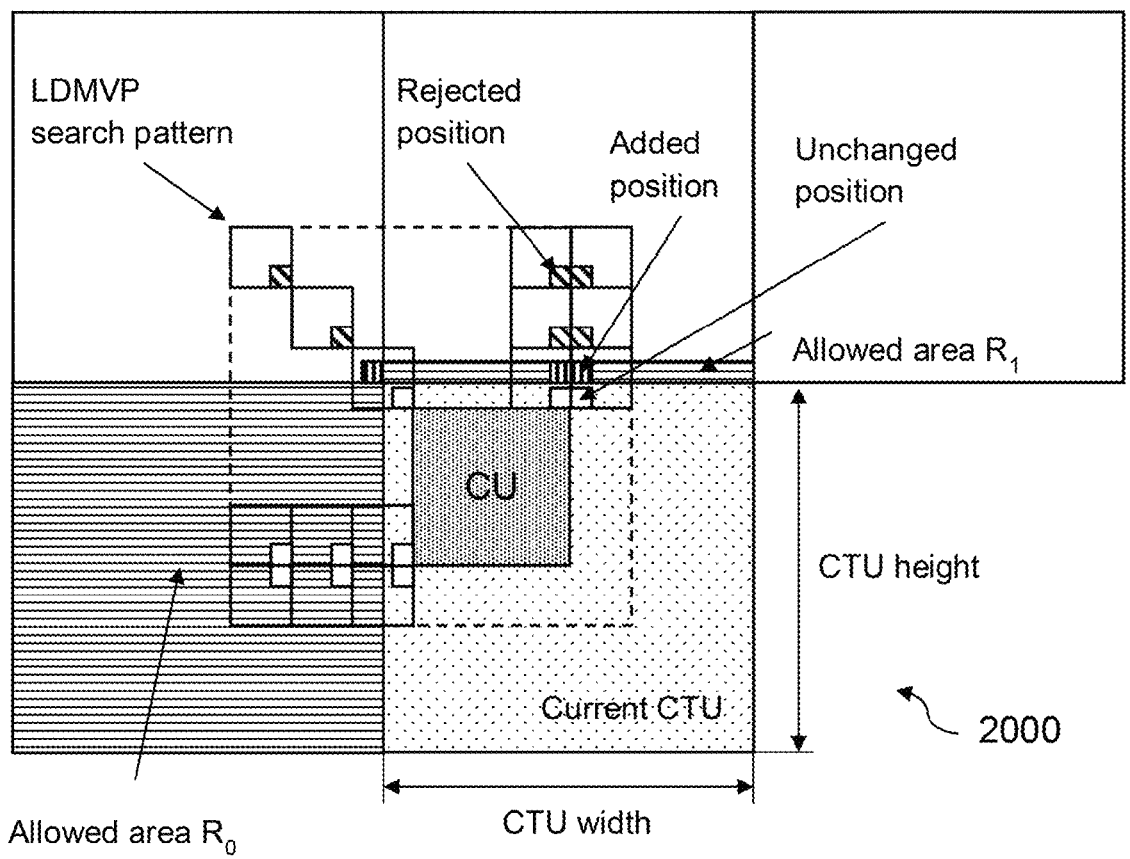
FIG. 20 is a fifth example illustrating the application of the replacePosition procedure on the "diagonal" pattern.

This means that, starting with the excluded pattern positions, their substitute positions are such so as to be available and/or stored in the buffer. This is exemplified in FIG. 20, again for the "diagonal" pattern and using the same labeling of the squared or regions referring to rejected pattern positions and unchanged positions. As can be seen in the example of FIG. 20, in the allowed region R1 there are now two positions added to this region (marked as vertical line pattern). These points would not be part of the region R1 if only the pattern positions were used, as they are not part of the original pattern. In other words, as before the pattern positions not within any of the regions $R_0$ or $R_1$ are still rejected, but they are still used to determine if and where to add one or more new positions such that they are within any of the allowed motion vector regions. According to an embodiment, the substitute MV positions are determined to fulfill the condition that a distance between the substitute MV positions and the excluded MV positions is shortest. The term "distance" refers to a measure for the magnitude of a spatial separation between two points along a certain direction. The spatial separation may be in units of the number of pixels along the pixel x and/or pixel y direction, using the pixel as unit for the spatial measure. The distance may be calculated according to a metric, for example, an Euclidean and/or the p-norm with p equal to or larger than one.

For the example shown in FIG. 20, applying the shortest distance condition on the discarded pattern positions, then for the second discarded position of the top-left part in the top-left CTU, a new position is added in the bottom-right corner of the top-left CTU, so that the added position lies within region $R_1$. No new position is added for the first discarded position because it has a larger distance to region $R_1$ than the second position. Similar applies to the respective second and first discarded pattern positions within the CTU at the top of the current CTU.

The "distance" condition is one example of a predetermined condition and is not restricted to this condition. For example, the distance condition may be combined with a distance cutoff corresponding to a threshold value, in which case a new position may be added to a region $R_1$ if the distance is equal to or lower than the cutoff value. Other options and or combinations of different conditions may be applicable so as to add one or more new positions to be available and/or stored in the buffer.

Figure 21:
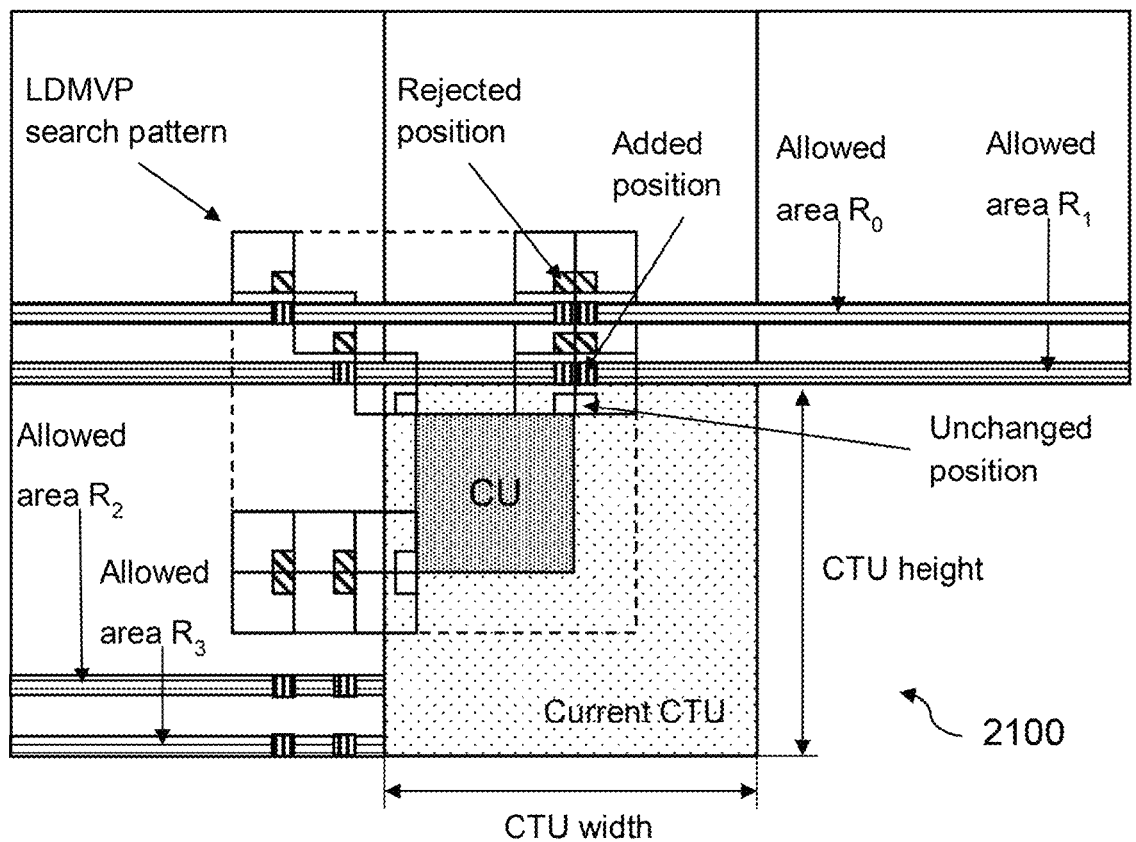
FIG. 21 is a sixth example illustrating the application of the replacePosition procedure on the "diagonal" pattern.
Figure 22:
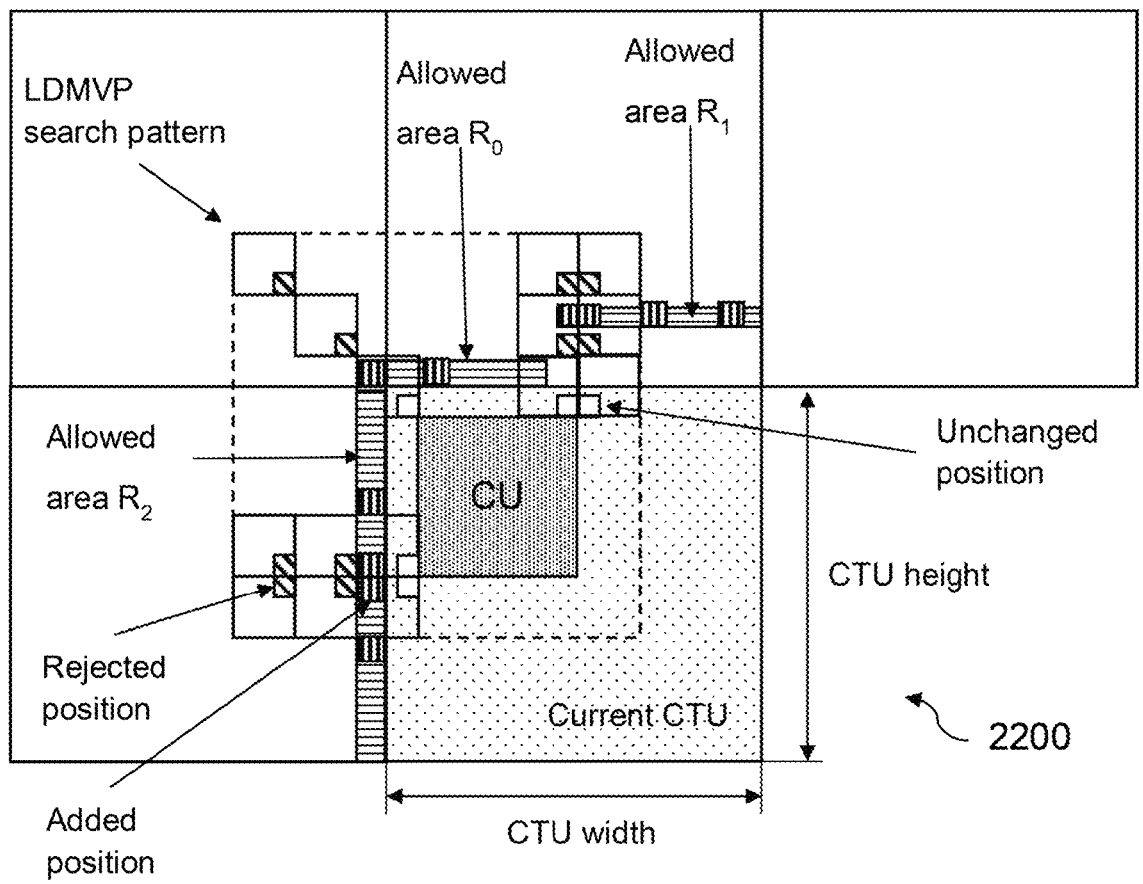
FIG. 22 is a seventh example illustrating the application of the replacePosition procedure on the "diagonal" pattern.
Figure 23:
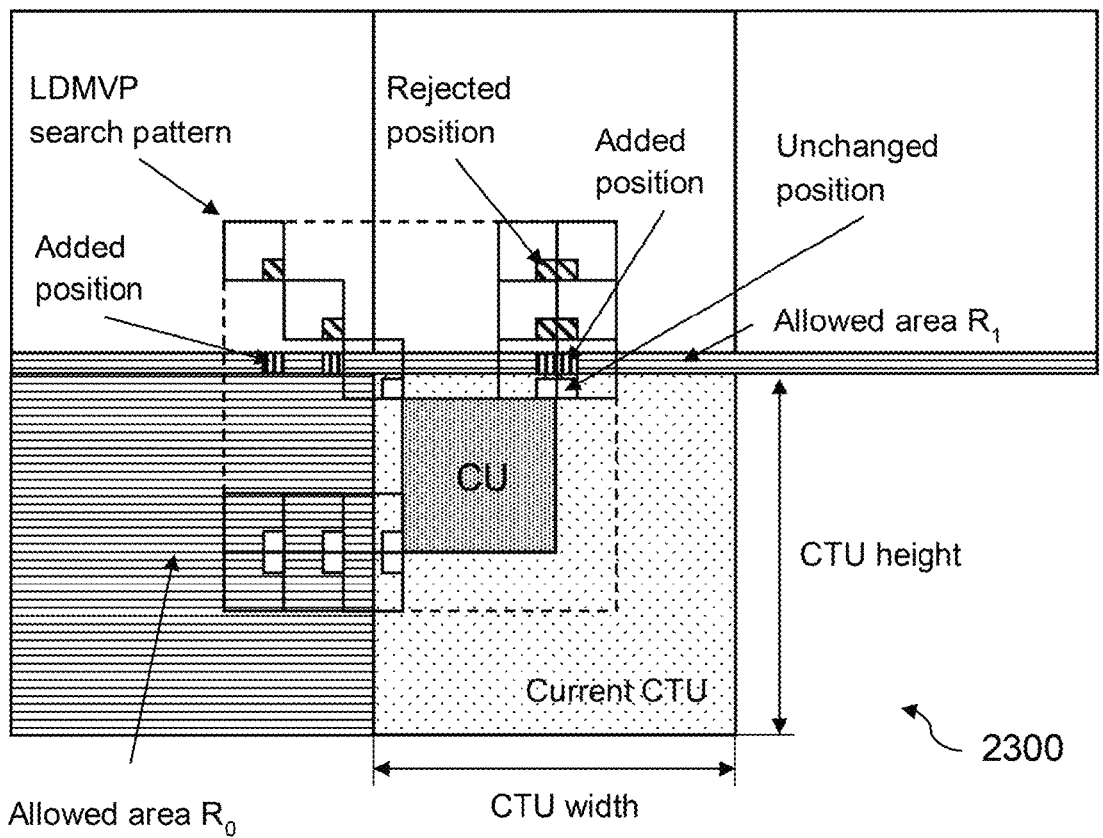
FIG. 23 is an eight example illustrating the application of the replacePosition procedure on the "diagonal" pattern.

FIGS. 21 to 23 show further examples for the addition of new positions by replacing one of the pattern positions according to a predetermined condition, such as the shortest distance of the examples of FIGS. 20 to 23. As can be discerned from FIGS. 21 to 23, the addition of new positions depends on the arrangement of the regions $R_i$ within the CTUs neighboring the current CTU, since this determines besides the pattern itself the relative spatial arrangement of the pattern positions to the regions $R_i$.

This means that, as a best case scenario, the number of pattern positions may be preserved, since all of the discarded positions of the original pattern are replaced by new positions. This is the case in the example of FIG. 21, as a result of the particular choice of the regions $R_0$ to $R_3$.

Figure 19:
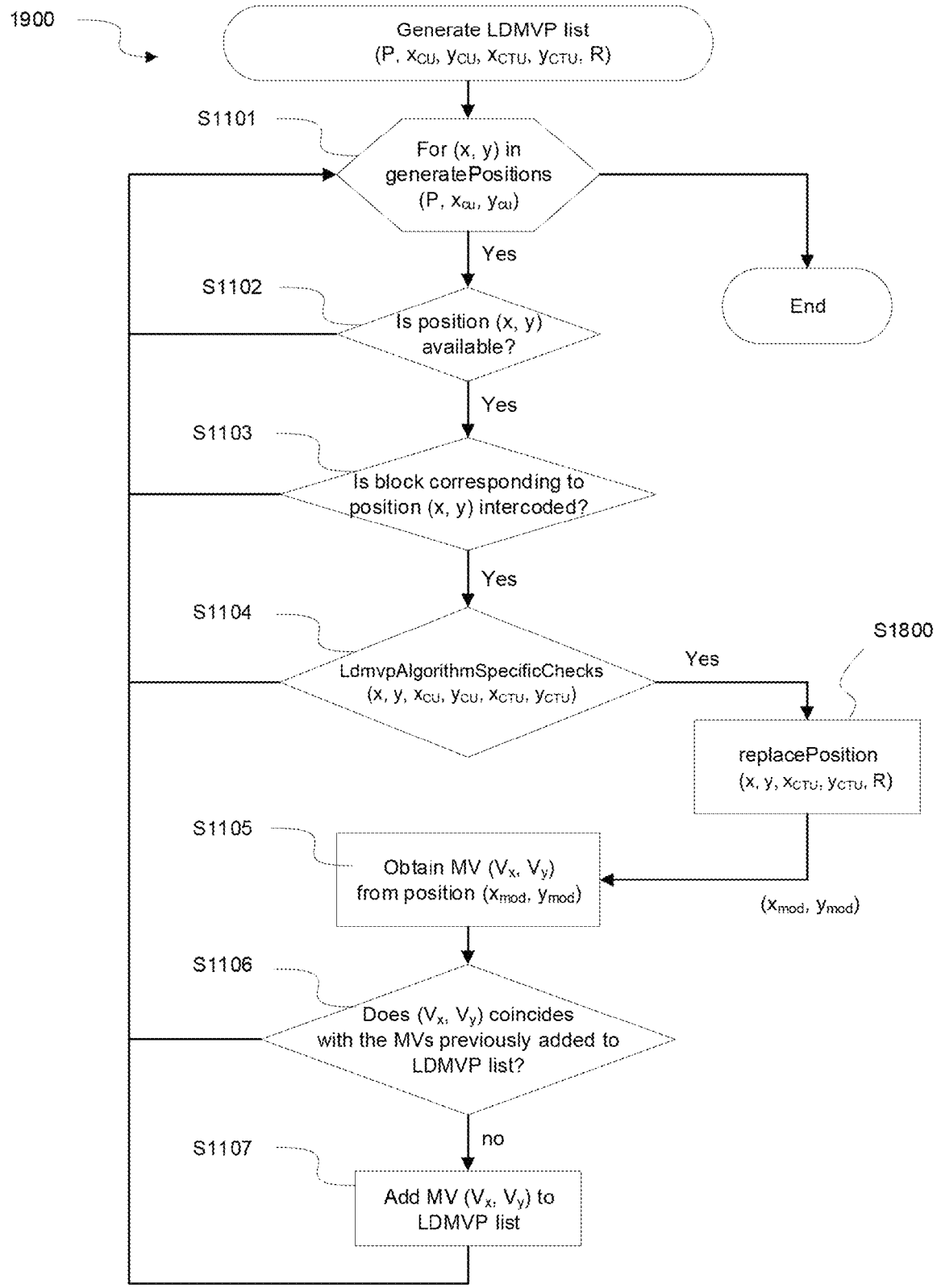
FIG. 19 is a flowchart of the LDMVP list generation algorithm, amended by the procedure replacePosition.

In an exemplary embodiment of the present disclosure, the LDMVP list generation algorithm comprises a procedure replacePosition(x, y, $x_{CTU}$, $y_{CTU}$, R) shown by the flowchart of FIG. 19, which performs replacing one or more pattern positions. With respect to the method steps S1101 to 1107 of the LDMVP list generation algorithm, the method steps of the replacePosition procedure is included as step S1800 into the flowchart of FIG. 19. The input parameters for this procedure are: tested position (x,y), current CTU position ($x_{CTU}$, $y_{CTU}$), and set R of rectangles defining areas in CTU's around the current CTU, from which allowed motion vector candidates are taken.

Figure 18:
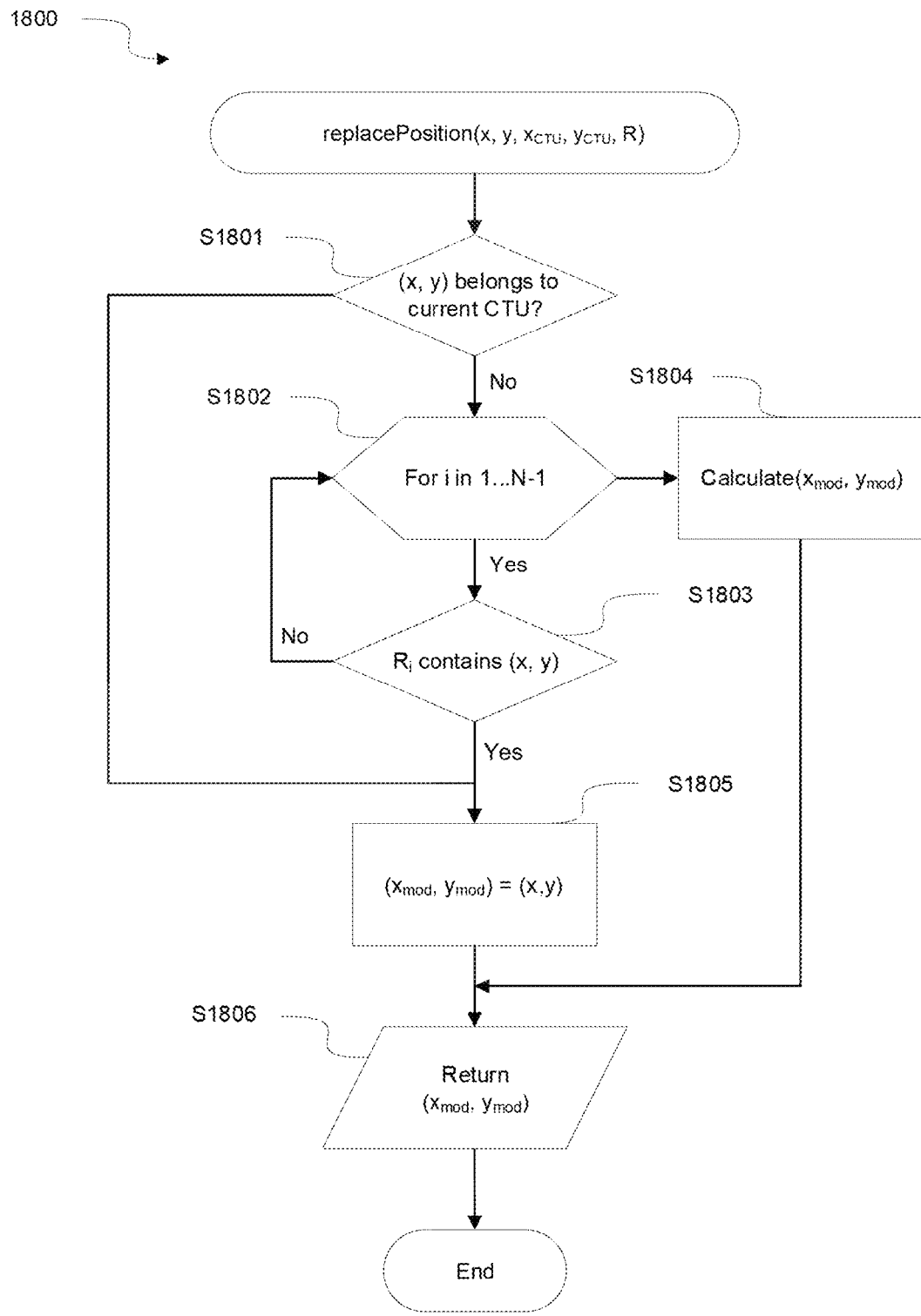
FIG. 18 is a flowchart of the procedure replacePosition.

FIG. 18 shows a flowchart of an exemplary implementation of the procedure replacePosition. The procedure performs a check whether the given position (x,y) belongs to either the current CTU or one of the rectangles $R_i$ (steps S1801 and S1803). The check S1803 is performed for all the rectangle regions $R_i$ (step S1802). If the position (x,y) does not belong to the current CTU or one of the rectangles Ri, then the position (x,y) is modified to a position ($x_{mod}$, $y_{mod}$) performed in step 1804, in order to meet the requirements mentioned above, namely the distance between position (x,y) and ($x_{mod}$,$y_{mod}$) being shortest. The modified position ($x_{mod}$, $y_{mod}$) may be calculated, for example, as being a position nearest to the (x,y) position that belongs to either the current CTU or to one of rectangles $R_i$. If the position (x,y) belong to the current CTU or to any of the rectangle regions $R_i$, the modified position ($x_{mod}$,$y_{mod}$) is assigned the value of (x,y) in step S1805 with ($x_{mod}$,$y_{mod}$)=(x,y). The procedure returns one or more modified positions ($x_{mod}$, $y_{mod}$) as output (step S1806).

The term "nearest" refers to a distance between the position (x,y) and the modified position ($x_{mod}$,$y_{mod}$). The distance may be calculated using a metric, for example, an Euclidean metric or a p-norm with p being equal to or larger than one. The position ($x_{mod}$,$y_{mod}$) may be determined or calculated by any other method fulfilling the requirement mentioned above.

The exemplary implementation of the LDMVP list generation algorithm comprising the replacePosition procedure is depicted by the flowchart in FIG. 19. The set R may be empty, which means that the procedure modifies the input position (x,y) to the position ($x_{mod}$, $y_{mod}$) so as to belong to the current CTU. In addition or optionally, the replacePosition procedure may replace two different positions ($x_0$, $y_0$), ($x_1$, $y_1$) to the same position ($x_{mod}$, $y_{mod}$). This means that one of the positions ($x_0$, $y_0$) or ($x_1$, $y_1$) is deleted. Thus, in this case the number of MV candidate positions is reduced by one.

FIGS. 20 to 23 show some examples illustrating the application of the replacePosition procedure to the "diagonal" pattern depicted in FIG. 8 for the case of the CU position is (8, 8) pixels relative to the CTU position ($x_{CTU}$, $y_{CTU}$). The rectangles R in these examples are set as [$x^0_i$, $y^0_i$, w, h], where ($x^0_i$, $y^0_i$) is a top left position of the rectangle relative to the position ($x_{CTU}$, $y_{CTU}$), w and h is rectangle's width and height respectively.

For these exemplary settings, Table 2 provides for each of examples 5 to 8 the respective settings for the rectangles $R_i$, which matches rectangle sets $\{R_i\}$ and the figures, illustrating the application of the replacePosition procedure to the "diagonal" pattern. The positions that are removed/rejected by the replacePosition procedure are marked in a black-white hashed pattern, and positions that are added by replacePosition procedure are marked in vertical line pattern. The rectangles R are marked with a horizontal line pattern.

TABLE 2 replacePosition procedure applied on examples 5 to 8

| Example number | Rectangles set $\{R_i\}$ | FIG. |
|---|---|---|
| 5 | $R_0$ = [−ctuWidth, 0, ctuWidth, ctuHeight]<br>$R_1$ = [−1, −1, ctuWidth + 1, 1] | FIG. 20 |
| 6 | $R_0$ = [−ctuWidth, −16 − 1, 3 *ctuWidth, 1],<br>$R_1$ = [−ctuWidth, −1, 3 *ctuWidth, 1],<br>$R_2$ = [−ctuWidth, ctuHeight − 16 − 1, ctuWidth, 1],<br>$R_3$ = [−ctuWidth, ctuHeight − 1, ctuWidth, 1]} | FIG. 21 |
| 7 | $R_0$ = [−1, −1, ctuWidth/2 + 1, 1],<br>$R_1$ = [ctuWidth/2, −16 − 1, ctuWidth − ctuWidth/2, 1],<br>$R_2$ = [−1, 0, 1, ctuHeight]} | FIG. 22 |
| 8 | $R_0$ = [−ctuWidth, 0, ctuWidth, ctuHeight]<br>$R_1$ = [−ctuWidth, −1, 3 *ctuWidth, 1], | FIG. 23 |

In the previous embodiment, new one or more positions have been added for the discarded pattern positions.

According to an embodiment, the processing circuitry of the apparatus determines the MVCs for the current CU including adjusting the excluded MV positions to adjusted MV positions determined so as to be available and/or stored in the buffer.

This embodiment has some resemblance with the previous embodiment in that again the discarded/excluded pattern positions are used for determining MV positions by adjustment. Moreover, in this embodiment not necessarily all of the excluded positions may not be subject to a position adjustment, as discussed in the following with reference to FIGS. 24 to 27. The result of the position adjustment is that the adjusted positions are available and/or stored in the buffer. This means that the motion information is available and/or stored in the buffer.

Figure 24:
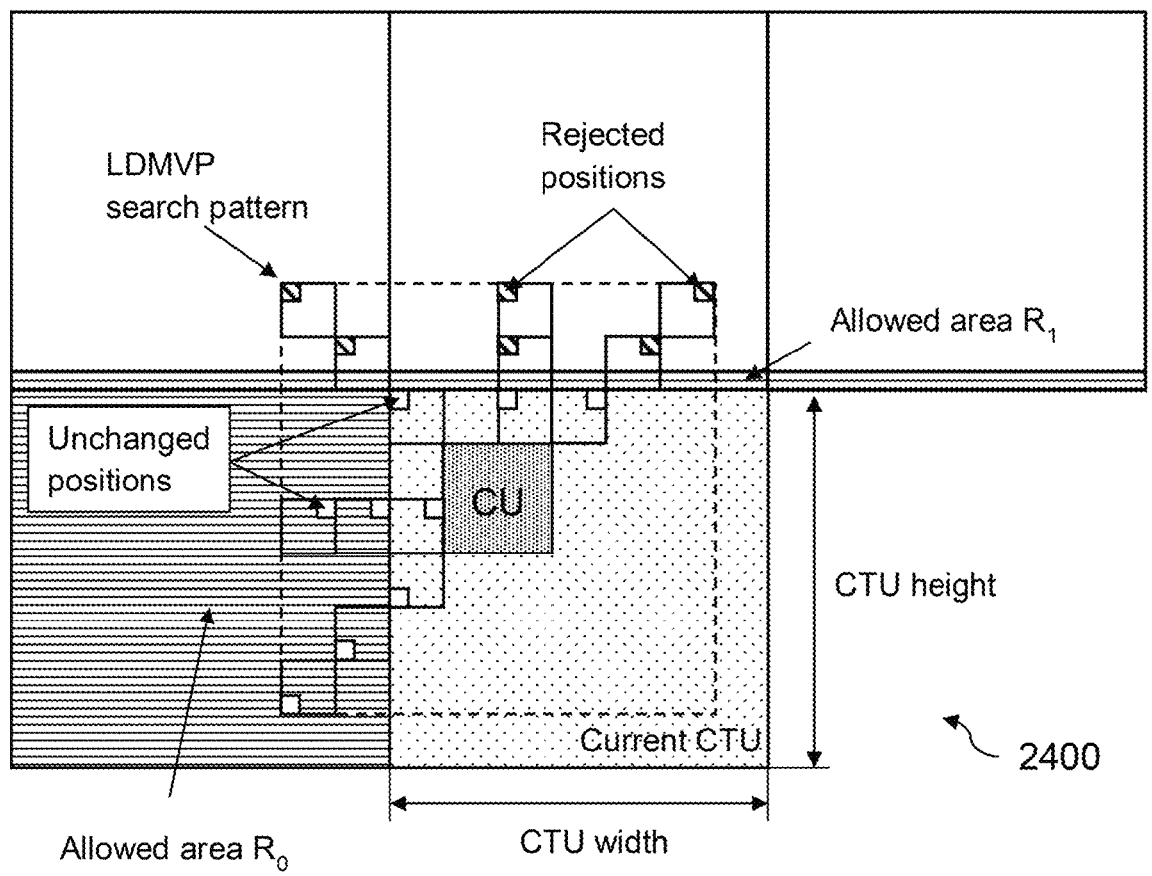
FIG. 24 is an example of a LDMVP pattern referred to as "sun" LDMVP pattern, along with allowed regions $R_0$ and $R_1$.

FIG. 24 shows an exemplary embodiment using a "sun" pattern. This pattern differs from the "diagonal" pattern, for example, in that the initial pattern positions are arranged relative to the current CU at its corners at the top-left, top-right, bottom-left along a diagonal direction, and at the mid of the left edge and top edge along the left and top direction. In this way, the "sun" pattern covers the upper "triangle" regions of the CU in an isotropic-like manner. This pattern is therefore quite suitable for possibly using motion information "distributed" more uniformly in the upper and left region around the current CU.

Figure 25:
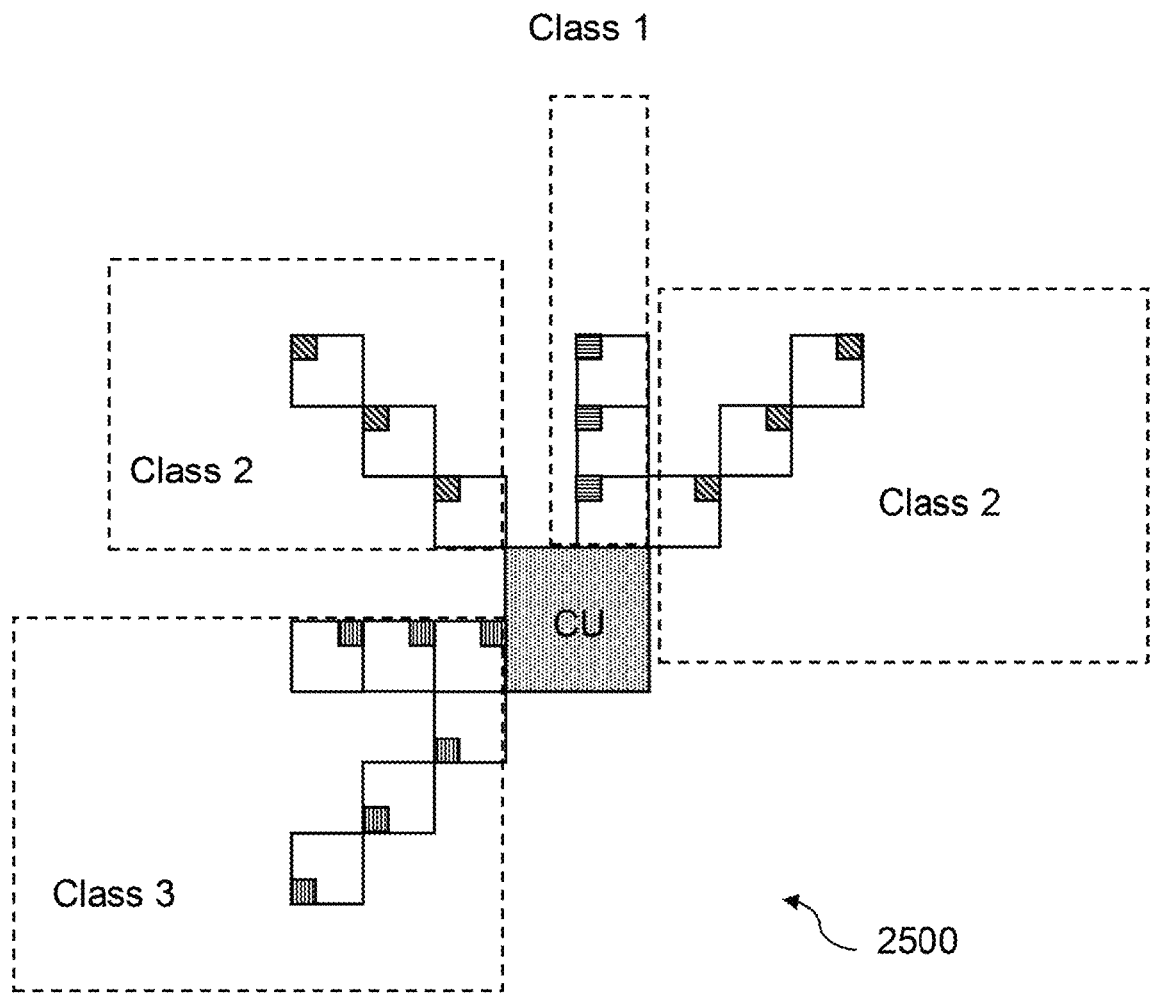
FIG. 25 is an example of dividing the "sun" LDMVP pattern into different classes.

As shown, the regions $R_0$ and $R_1$ for allowed motion vectors are again arranged as in FIG. 23, where $R_0$ covers the entire CTU to the left of the current CTU, whereas $R_1$ is entails motion information over a small bottom region of CTUs at the top-left, top, and top-right of the current CTU. As in the previous embodiments, initial pattern positions within the current CTU and already within any of the regions $R_0$ and/or $R_1$ remain unchanged (white squares). Positions rejected from the pattern are marked as black-white hashed pattern, and these are subject to a position adjustment. In order to implement that not necessarily all of the excluded pattern positions are adjusted, the pattern positions may be first grouped into classes, as illustrated in the example of FIG. 25.

One option for grouping pattern positions into classes may be splitting the LDMVP pattern positions (which may be referred to as a set S) into subsets Si. A subset Si may be referred to also as a series. This means that the pattern positions in a series Si are located along a particular direction. Said direction may, for example, be along any of the top, top-right, top-left, left, and/or bottom-left. In the example of FIG. 25, there are for the "sun" pattern five series S1 to S5, with each series comprising three positions of the sun pattern.

Assuming $n_i$ positions in series $S_i$, the respective positions may be represented by positions $(x_{0i}, y_{0i})$, $(x_{0i}+dx_i, y_{0i}+dy_i)$, $(x_{0i}+2*dx_i, y_{0i}+2*dy_i)$, ..., $(x_{0i}+n_i*dx_i, y_{0i}+n_i*dy_i)$, where $(x_{0i}, y_{0i})$ refers to a position of the first position of the series. The first position may, for example, be the position nearest to the current CU. For Example, in the series of pattern positions being in the top direction, the first position is the position at the bottom close to the top edge of the current CU. The $dx_i$ and $dy_i$ refer to offsets between neighboring positions in the series along the horizontal and vertical direction respectively.

The pattern elements may now be grouped into classes, for example, based on the $dx_i$ and/or $dy_i$ values of the corresponding series. This means that a class of positions may be characterized in terms of the values $dx_i$ and/or $dy_i$, including whether they are positive or negative. As a result, each class may include one or more series of the pattern positions.

For example, for the case of FIG. 25, using the above discussed means to classify pattern positions, pattern positions of the sun pattern may be grouped into their respective classes (here class 1 to 3) according to the following restrictions for dx and dy:

$dx=0, dy<0$            Class1:

$dx!=0, dy<0$           Class2:

$dx<0, dy>=0$.          Class3:

The operation "!=" means "not being equal to". The result of applying the dx-dy-based classification to the sun pattern results into three classes, with class 1 including one series, and classes 2 and 3 comprising each two series.

For example, the pattern positions may be grouped into classes depending on whether one or more pattern positions are located to the left and/or bottom-left of the current CTU. In the example of FIG. 25, this would apply for the pattern positions of class 3. In addition or optionally, pattern positions at the top of the current CTU, i.e. at the top-left, top, and/or top-right, may be grouped further depending on whether or not their x positions and/or y positions are the same. In the example of FIG. 25, the top pattern positions along the left and right diagonal of the CU have both different x and x positions. Thus, they are grouped into a common class 2. In turn, the top pattern positions along the mid upwards of the CU have the same x position but different y positions. Thus, they are grouped into class 1.

Hence, in summary, the pattern positions in the top upward direction of the CU is class 1, the pattern positions in the top left-right diagonal direction is class 2, and the remaining pattern positions is class 3, as illustrated in FIG. 25. Pattern positions within the current CTU and/or within any of the regions $R_0$ and $R_1$ are not changed, as shown in FIG. 26.

According to an embodiment, the determining of the adjusted MV positions includes assigning the excluded MV positions to assigned MV positions along a x direction along a width of the current CTU and/or a y direction along a height of the current CTU.

The x and y direction, respectively, x and y positions are in pixel coordinates with the x pixel axis going along the width of the CTU and the y pixel axis going along the CTU height.

Figure 26:
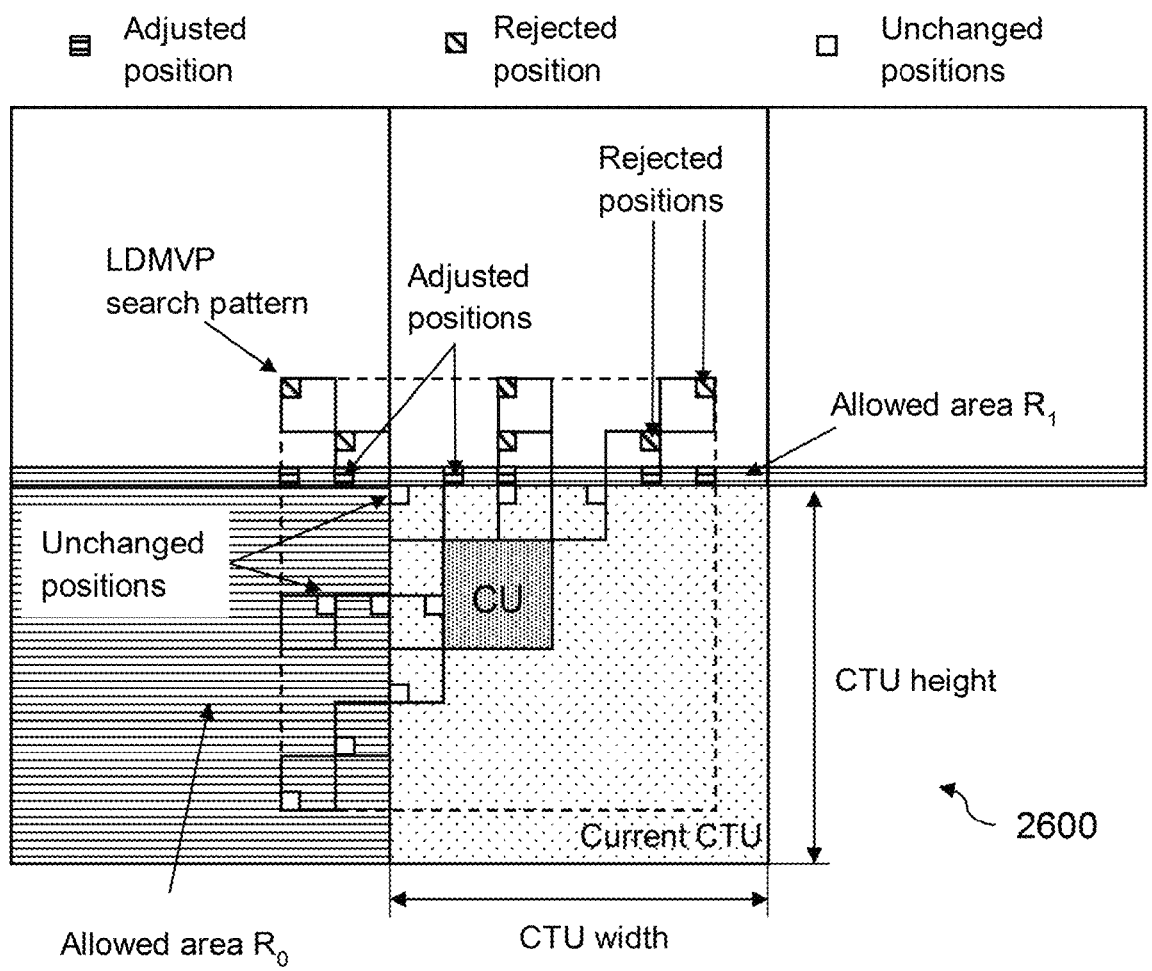
FIG. 26 is an example illustrating the application of the adjustCandidatePositions procedure on the "sun" pattern.

This is illustrated by the example of FIG. 26, where the excluded pattern positions in class 1 and 2 are assigned new positions, i.e. their positions are adjusted. Here, their y position is adjusted along the CTU height, so as to lie in region $R_1$. Since the pattern positions in class 2 have different x positions, their adjusted positions are located in region $R_1$ at different positions. In contrast, the pattern positions of class 1 lie after position adjustment within region $R_1$ at the same position since their x positions were the same originally.

According to an embodiment, the determining includes reassigning x positions or y positions of one or more assigned MV positions having the same x position or the same y position to reassigned y positions or x positions using a predetermined prescription.

The prescription may be a function. This means that, for example, the reassigned positions may be calculated using said function with the assigned position as input. The calculation may be performed in dependence on the CU position and/or the pattern position.

In one exemplary embodiment, the predetermined prescription is shifting the y or x components of the assigned MV positions by an offset value.

The offset value may be a number of pixels so as to shift the y and/or x position (e.g. in pixel units) by the pixel offset by adding and/or subtracting the offset value to the adjusted y and/or x position value. Alternatively, the predetermined prescription may be a factor by which the y and/or x position may be multiplied and/or divided. Other prescriptions are possible for achieving reassigning of the adjusted positions when their x and/or y position is the same.

The offset value may depend on the CU position and/or the pattern position. For example, the y coordinate may be modified to have a distance less than 4 points (MV storage grid size) from the top CTU border. This means that the offset value may be restricted depending on the CU position and a distance. Alternatively and/or optionally, the offset value may be predetermined. In any case, the assigned positions should be reassigned such that they are not located outside an allowed region after the shift.

In the example of FIG. 26, the adjusted positions of the pattern positions in class 1 have the same y position. Since their x position are the same both for the adjusted and their original pattern positions, they are located at the same position in region $R_1$. Hence, one of the two adjusted positions is reassigned a new x position by shifting through an offset. In other words, adjusted positions having the same position may be spread within a region $R_i$ so that the reassigned positions have different positions. In FIG. 26, this is the case for the class 1 pattern positions which after position assignment and subsequent position reassignment have a different position. In this embodiment, where pattern positions may be grouped into classes, the number of motion vector candidate positions is the same as the number of positions of the pattern. Moreover, the pattern and the regions are chosen in this example to use motion information restricted to CTUs at the top of the current CTU. In the examples shown in FIGS. 24 to 26, the pattern positions are at the corners of the current CU at the top-left, top-right, bottom-left along the diagonals. Further, positions are located horizontally from the mid of the left edge toward the left, and vertically from the mid of the top edge going upwards. In this disclosure, we refer to this pattern as the "sun" pattern.

In this example, it is assumed that the CTU decoding order is from left to right and from top to bottom. Accordingly, the image portions on the top and to the left of the current CTU are available in the current frame as well as motion vector information. The remaining portions may depend on the current CTU and thus, can only be decoded after decoding the current CTU. However, the present disclosure is not limited thereto. Another decoding order may be used in general, resulting in different availability of the current frame portions.

For the patterns, such as the ones shown in FIGS. 7 to 10, the "sun" pattern" or any other suitable pattern, the position adjustment of pattern positions may be implemented through the adjustCandidatePositions procedure as follows:

1. All candidates are divided into three classes as depicted in FIG. 25.
2. For the white squares candidates position adjustment is not used.
3. For the black-white hashed candidates (class 1 and class 2) y position is changed to top y position of current CTU decremented by one.
4. For the black-white hashed left-right candidates (class 2) x position is not changed.
5. For the black-white hashed mid candidates (class 1) new x position can be calculated for example using AdjustCandidatePositions(x, y, topYposOfCurCtu, xOffsetForOneGrid, log2Gy) procedure.

As discussed before, the outcome of applying the procedure adjustCandidatePositions on the "sun" pattern is illustrated in FIG. 26.

Figure 27:
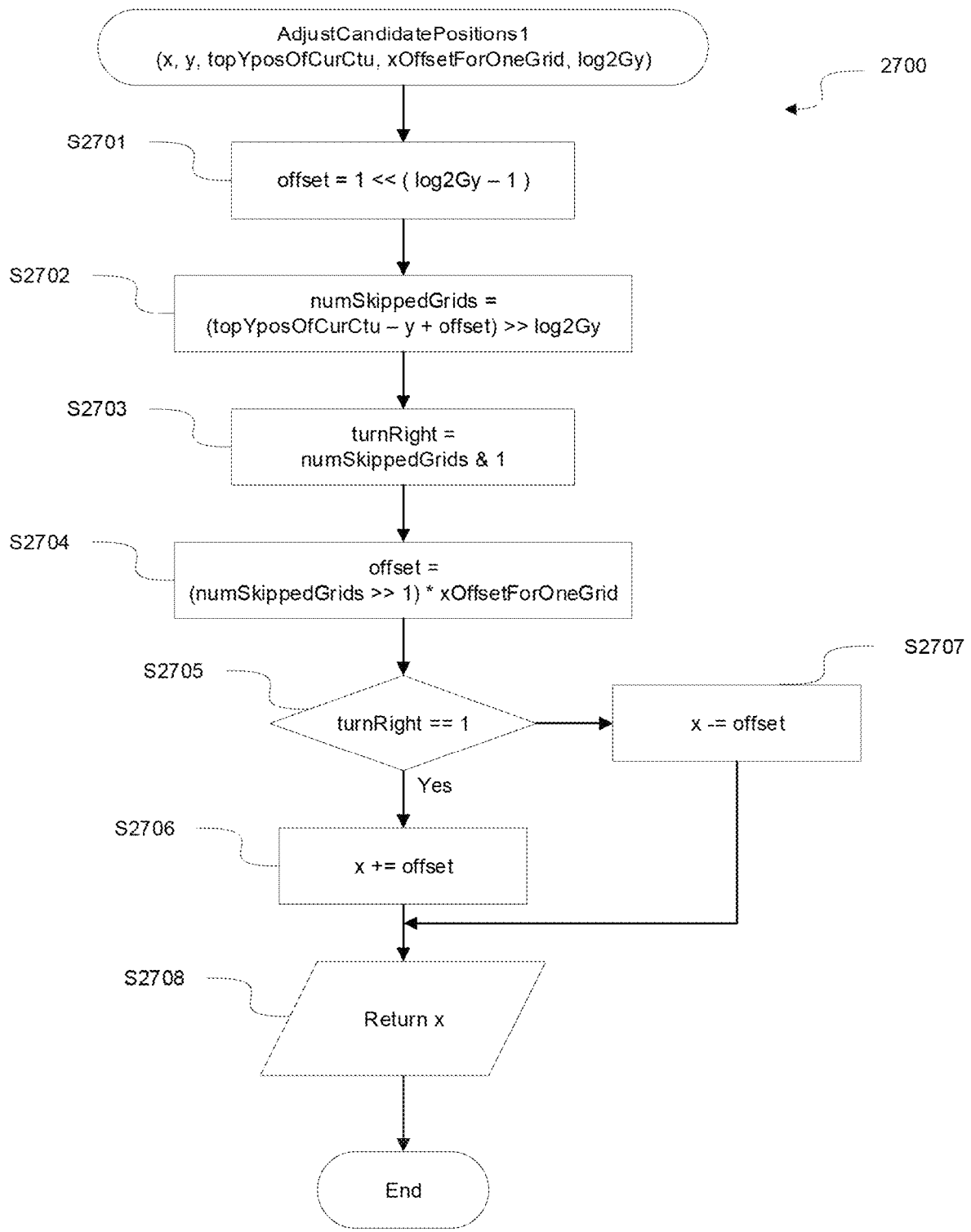
FIG. 27 is a flowchart of the procedure adjustCandidatePositions.

FIG. 27 shows a flowchart of the procedure AdjustCandidatePositions(x, y, topYposOfCurCtu, xOffsetForOneGrid, log2Gy) with an example of an implementation. Here, topYposOfCurCtu is a top y position of the current CTU, and xOffsetForOneGrid may be, for example, w>>2, Gx or Gy; 2 log2Gy, where w is the width of the current CU and Gx and Gy is width and height of the pattern grid respectively.

The aim is to calculate the offset value, by which, in this example, the x position is shifted to the left or right by subtracting (step S2707) or adding (step S2706) the offset. In step 2701, is shifted (in this example here bitwise by the operator "<<") to the left. This corresponds to a multiplication of the offset value. In step S2702, the number of skipped grids is determined with reference to the top y position of the current CTU, the y position of the point (x,y), and the offset. This value is (bitwise) shifted to the right, corresponding to a division. In step S2703, it is determined whether the number of skipped grids is even or odd (parity check). If the number is odd, the respective value "turnRight" is "1". In step 2704, the offset value is determined using the number of skipped grids and the x offset value for one grid. If turnRight is logical 1 (step S2705), the x position is shifted to the right by adding the offset value to the x value (step S2706). If not, then the x position is shifted to the left by subtracting the offset (step S2707). The adjusted candidate position is returned (step S2708).

The procedure AdjustCandidatePositions may be included as step S2700 into the flowchart of the LDMVP list generation algorithm at the same method location as the additionalChecks and replacePositions procedures, i.e. between the steps S1104 and S1105 (not shown).

The methods according to any of the above-discussed embodiments may be applied to any pattern, including LDMVP patterns. Moreover, the methods may be applied on a (LDMVP) pattern individually and/or in any combination thereof. This means that the methods may be applied in any order after a LDMVP pattern has been generated. Moreover, the methods may be implemented as separate procedures according to the present disclosure. Alternatively, the procedures may be implemented with any of the methods combined. For example, the method implemented in the procedure adjustPositions may be combined with the method implemented in the procedure replacePosition into one common procedure.

According to an embodiment, a method is provided for generating a list of one or more motion vector candidates, MVCs, comprises the steps of determining the MVCs for a current coding unit, CU, in dependence on a position of a pattern relative to a position of the current CU, the pattern defining positions of motion vectors, MVs, and on the position of the current CU within a coding tree unit, CTU.

The apparatus and method as described by the above embodiments may be used with different LDMVP patterns, for example, with the patterns depicted in FIGS. 7 to 10. The apparatus and method may be used with different LdmvpAlgorithmSpecificChecks(P, $x_{CU}$, $y_{CU}$, $x_{CTU}$, $y_{CTU}$) procedures. The apparatus and method may be used for both merge technique and advanced motion vector prediction. The apparatus and method could be used with different schemes of partitioning a CTU into CU, for example, quad tree, triple tree, binary tree and their combinations.

According to an embodiment, an encoder is provided for encoding a current coding unit, CU, of a video frame comprising an apparatus for generating a list of one or more MVCs according to any of the previous embodiments, an inter-prediction unit for determining prediction of the current CU according to at least one motion vector, MV, our of the MVCs of said list; and a compression unit for encoding the current CU by using the prediction of the CU.

According to an embodiment, a decoder is provided for decoding a current coding unit, CU, of a video frame comprising an apparatus for generating a list of one or more MVCs according to according to any of the previous embodiments; an inter-prediction unit for determining prediction of the current CU according to at least one motion vector, MV, our of the MVCs of said list; and a decompression unit for decoding the current CU by using the prediction of the CU.

The MVC list may be used for motion prediction using motion information through motion vectors at the positions of one or more of the MVCs.

The encoding may be performed, for example, by calculating a difference between the current CU and the prediction and by coding the residuals (differences) including quantization and/or entropy coding. The prediction is given by the block to which the best motion vector. The best motion vector is determined out of the MV candidate list by calculating a similarity measure such as sum of absolute differences (SAD). From the encoder, the best motion vector may be indicated to the decoder within the bitstream of the coded video, e.g. as an index to the list of MVCs. The MVC corresponding (assigned) to the index is the best MV to be also used for the decoding. Here, the term "best" refers to the MV selected by the encoder and to be used by the decoder to obtain prediction for the current block (CU). This may be performed even if there is no residual, since the prediction is already close to the CU, corresponding to a zero (after quantization) residual. In principle, an index to the list may also be determined implicitly at the encoder and the decoder side. This may, for example, be the case for the merge mode, when the number of MV candidates is just one candidate, so that signaling of indices is not needed.

According to an embodiment, a computer-readable non-transitory medium is provided for storing a program, including instructions which when executed on a processor cause the processor to perform the method steps.

Summarizing, the present disclosure relates to encoding and encoding of video images. Motion vectors are used as predictors for prediction of an image for a current coding unit CU, which is within a current coding tree unit CTU. The motion vectors are taken from a list of motion vector candidates MVCs. The list is generated for the current CU using a pattern of positions of allowed motion vectors, and in dependence on the positions of the pattern relative to the current CU, and on the position of the current CU within the current CTU. From the pattern, a subset of positions is selected and positions are restricted to positions within the current CTU, while other pattern positions not available or not stored in a buffer are excluded. Other excluded pattern positions may be substituted and/or adjusted to as to become available and/or are being stored in the buffer. The substitution and the adjustment of excluded pattern positions may be performed in dependence on the excluded positions relative to the substituted/adjusted positions.

What is claimed is:

1. An apparatus for generating a list of one or more motion vector candidates, MVCs, wherein the apparatus comprises:
   a processing circuitry configured to:
      determine the list of one or more MVCs for a current coding unit, CU, in dependence on:
         a pattern that defines a set of positions relative to a reference position of the current CU,
         a relative position of the current CU within a current coding tree unit, CTU, and
         a set of rectangles that define rectangular areas in one or more neighboring CTUs around the current CTU, wherein at least one rectangular area defined in the set of rectangles has a width or height that is greater than a width or a height of the current CTU, and wherein an area of the CTU given by multiplying the width of the CTU by the height of the CTU is greater than at least one rectangular area defined in the set of rectangles,
   wherein determining the list of one or more MVCs for the current CU includes: selecting a subset of positions defined by the pattern as positions of motion vectors, MVs, added to the list of one or more MVCs, wherein at least one position in the pattern is excluded from the subset of positions based on the relative position of the current CU within the current CTU and a location of the at least one position in the pattern relative to the reference position, wherein the location of each position in the pattern excluded from the subset of positions is not included in any of the rectangular areas defined in the set of rectangles, or, responsive to determining that all positions of the pattern are excluded based on the relative position of the current CU within the current CTU, replacing positions defined by the pattern with substitute positions of MVs added to the list of one or more MVCs, and wherein at least one position in the pattern is included in the subset of positions responsive to belonging to a rectangular area defined by the set of rectangles in one of the neighboring CTUs.

2. The apparatus according to claim 1, wherein the selecting the subset of positions includes selecting, from the positions defined by the pattern, those positions that are within the current CTU.

3. The apparatus according to claim 1, wherein the selecting the subset of positions is performed by excluding from the positions defined by the pattern those positions that are not available or are not stored in a buffer.

4. The apparatus according to claim 3, wherein the processing circuitry is further configured to replace one or more of the excluded positions by substitute positions determined in dependency on the excluded positions so as to fulfill one or more predetermined conditions.

5. The apparatus according to claim 4, wherein the one or more predetermined conditions includes a condition that the substitute positions are available or are stored in the buffer.

6. The apparatus according to claim 4, wherein the substitute positions are determined to fulfill a condition that a distance between the substitute positions and the excluded positions is shortest.

7. The apparatus according to claim 3, wherein the processing circuitry is further configured to adjust the excluded positions to adjusted positions determined to be available or stored in the buffer.

8. The apparatus according to claim 7, wherein the adjusting the excluded positions includes assigning the excluded positions to assigned positions along an x direction along a width of the current CTU or a y direction along a height of the current CTU.

9. The apparatus according to claim 8, wherein the adjusting the excluded positions includes reassigning x positions or y positions of one or more assigned positions having the same x position or the same y position to reassigned y positions or reassigned x positions using a predetermined prescription.

10. The apparatus according to claim 9, wherein the predetermined prescription is shifting y components or x components of the assigned positions by an offset value.

11. An encoder for encoding a current coding unit, CU, of a video frame comprising:
   an apparatus for generating a list of one or more motion vector candidates, MVCs, according to claim 1;
   an inter-prediction unit for determining prediction of the current CU according to at least one motion vector, MV, of the MVCs of said list; and
   a compression unit for encoding the current CU by using the prediction of the current CU.

12. A decoder for decoding a current coding unit, CU, of a video frame comprising
   an apparatus for generating a list of one or more motion vector candidates, MVCs, according to claim 1;
   an inter-prediction unit for determining prediction of the current CU according to at least one motion vector, MV, our of the MVCs of said list; and
   a decompression unit for decoding the current CU by using the prediction of the current CU.

13. A method for generating a list of one or more motion vector candidates, MVCs, wherein the method comprises the steps of:
   determining the list of one or more MVCs for a current coding unit, CU, in dependence on:
      a pattern that defines a set of positions relative to a reference position of the current CU,
      a relative position of the current CU within a current coding tree unit, CTU, and
      a set of rectangles that define rectangular areas in one or more neighboring CTUs around the current CTU, wherein at least one rectangular area defined in the set of rectangles has a width or height that is greater than a width or a height of the current CTU, and wherein an area of the CTU given by multiplying the width of the CTU by the height of the CTU is greater than at least one rectangular area defined in the set of rectangles, wherein determining the list of one or more MVCs for the current CU includes selecting a subset of positions defined by the pattern as positions of motion vectors, MVs, added to the list of one or more MVCs, wherein at least one position in the pattern is excluded from the subset of positions based on the relative position of the current CU within the CTU and a location of the at least one position in the pattern relative to the reference position, wherein the location of each position in the pattern excluded from the subset of positions is not included in any of the rectangular areas defined in the set of rectangles, or, responsive to determining that all positions of the pattern are excluded based on the relative position of the current CU within the current CTU, replacing positions defined by the pattern with substitute positions of MVs added to the list of one or more MVCs, and wherein at least one position in the pattern is included in the subset of positions responsive to belonging to a rectangular area defined by the set of rectangles in one of the neighboring CTUs.

14. A non-transitory computer-readable medium storing a program, including instructions that, when executed on a processor, cause the processor to perform the method according to claim 13.

\* \* \* \* \*